(12) United States Patent
Reimann et al.

(10) Patent No.: US 11,830,467 B2
(45) Date of Patent: *Nov. 28, 2023

(54) UNIT CELL RESONATOR NETWORKS FOR TURBOMACHINERY BYPASS FLOW STRUCTURES

(71) Applicant: RAYTHEON TECHNOLOGIES CORPORATION, Farmington, CT (US)

(72) Inventors: Craig Aaron Reimann, Vernon, CT (US); Julian Winkler, Glastonbury, CT (US); Kenji Homma, Glastonbury, CT (US); Jeffrey Michael Mendoza, Manchester, CT (US); Ramons A. Reba, South Windsor, CT (US)

(73) Assignee: RTX COROPORATION, Farmington, CT (US)

( * ) Notice: Subject to any disclaimer, the term of this patent is extended or adjusted under 35 U.S.C. 154(b) by 65 days.

This patent is subject to a terminal disclaimer.

(21) Appl. No.: 17/503,285

(22) Filed: Oct. 16, 2021

(65) Prior Publication Data
US 2023/0117838 A1    Apr. 20, 2023

(51) Int. Cl.
*G10K 11/16* (2006.01)
*F02C 7/24* (2006.01)

(52) U.S. Cl.
CPC .............. *G10K 11/16* (2013.01); *F02C 7/24* (2013.01); *F05D 2220/323* (2013.01); *F05D 2260/96* (2013.01)

(58) Field of Classification Search
CPC ............ F05D 2260/96; F05D 2260/963; F05D 2260/964; F02C 7/24; F01N 1/02; F01N 1/023; F01N 1/026
See application file for complete search history.

(56) References Cited

U.S. PATENT DOCUMENTS

| | | | |
|---|---|---|---|
| 4,135,603 | A | 1/1979 | Lee et al. |
| 6,069,840 | A | 5/2000 | Griffin et al. |
| 6,098,926 | A | 8/2000 | Morgenthaler |
| 6,116,375 | A | 9/2000 | Lorch et al. |

(Continued)

FOREIGN PATENT DOCUMENTS

| | | |
|---|---|---|
| CN | 109501404 | 3/2019 |
| EP | 2820270 | 1/2015 |

(Continued)

OTHER PUBLICATIONS

USPTO; Non-Final Office Action dated Feb. 28, 2023 in U.S. Appl. No. 17/318,868.

(Continued)

*Primary Examiner* — Courtney D Heinle
*Assistant Examiner* — Danielle M. Christensen
(74) *Attorney, Agent, or Firm* — SNELL & WILMER L.L.P.

(57) ABSTRACT

An acoustic attenuation structure for a gas turbine engine includes a periodic structure having a first unit cell, the first unit cell having a first central body and a first axial tube disposed on the first central body and a second axial tube disposed on the first central body, opposite the first axial tube, each of the first axial tube and the second axial tube being in fluid communication with one another through the first central body.

15 Claims, 17 Drawing Sheets

(56) References Cited

U.S. PATENT DOCUMENTS

| | | | |
|---|---|---|---|
| 6,179,086 B1 | 1/2001 | Bansemir et al. | |
| 7,018,172 B2 | 3/2006 | Prasad et al. | |
| 7,076,956 B2 | 7/2006 | Young et al. | |
| 7,311,175 B2 | 12/2007 | Proscia et al. | |
| 7,334,998 B2 | 2/2008 | Jones et al. | |
| 7,540,354 B2 | 6/2009 | Morin et al. | |
| 7,607,287 B2 | 10/2009 | Reba et al. | |
| 10,066,548 B2 | 9/2018 | Gilson et al. | |
| 10,107,191 B2 | 10/2018 | Gilson et al. | |
| 10,113,559 B2 | 10/2018 | Turner et al. | |
| 10,209,009 B2 * | 2/2019 | Gerstler | F28D 15/04 |
| 10,371,381 B2 * | 8/2019 | Xu | F23M 20/005 |
| 10,704,841 B2 * | 7/2020 | Manzo | B22F 3/1115 |
| 10,724,739 B2 | 7/2020 | Kim et al. | |
| 10,823,409 B2 | 11/2020 | Bertoldi et al. | |
| 11,261,738 B2 * | 3/2022 | Chakrabarti | B22F 5/04 |
| 2005/0284690 A1 | 12/2005 | Proscia et al. | |
| 2007/0012508 A1 | 1/2007 | Demers | |
| 2009/0166127 A1 | 7/2009 | Thomas et al. | |
| 2013/0219922 A1 | 8/2013 | Gilson et al. | |
| 2018/0299066 A1 * | 10/2018 | Erno | F16S 5/00 |
| 2020/0101690 A1 | 4/2020 | Oishi et al. | |
| 2020/0191101 A1 | 6/2020 | Boardman et al. | |
| 2020/0378111 A1 | 12/2020 | Fishman et al. | |
| 2020/0384695 A1 | 12/2020 | Mardjono et al. | |
| 2020/0386154 A1 | 12/2020 | Gilson et al. | |
| 2021/0074255 A1 | 3/2021 | Guo et al. | |
| 2021/0095617 A1 | 4/2021 | Richter et al. | |
| 2021/0231057 A1 | 7/2021 | Livebardon et al. | |
| 2021/0372286 A1 | 12/2021 | Chakrabarti et al. | |

FOREIGN PATENT DOCUMENTS

| | | |
|---|---|---|
| EP | 2239420 | 1/2016 |
| EP | 3179071 | 6/2017 |
| EP | 3636550 P | 4/2020 |
| EP | 3869499 | 8/2021 |
| EP | 4089669 | 11/2022 |
| GB | 2361035 | 10/2001 |
| GB | 2471845 | 1/2011 |
| WO | 2005100753 | 10/2005 |
| WO | 2011034469 | 3/2011 |
| WO | 2013130295 | 9/2013 |
| WO | 2014105108 | 7/2014 |
| WO | 2020122886 | 6/2020 |
| WO | 2020221976 | 11/2020 |

OTHER PUBLICATIONS

European Patent Office, European Search Report dated Oct. 4, 2022 in Application No. 22172325.7.
European Patent Office, European Search Report dated Oct. 4, 2022 in Application No. 22173018.7.
Guo Jingwen Et A: "Wideband low frequency sound absorption by inhomogeneous multi-layer resonators with extended necks", Composite Structures, Elsevier Science Ltd, GB, vol. 260, Jan. 6, 2021 (Jan. 6, 2021).
Li Dingzeyu et al: "Acoustin voxels", ACM Transactions on Graphics, ACM, NY, US, vol. 35, No. 4, Jul. 11, 2016 (Jul. 11, 2016).
USPTO; Non-Final Office Action dated Nov. 10, 2022 in U.S. Appl. No. 17/535,270.
European Patent Office, European Search Report dated Mar. 24, 2023 in Application No. 22201750.1.
European Patent Office, European Search Report dated Apr. 14, 2023 in Application No. 22207011.2.
USPTO; Notice of Allowance dated Jun. 16, 2023 in U.S. Appl. No. 17/535,270.
USPTO; Non-Final Office Action dated Jun. 8, 2023 in U.S. Appl. No. 17/318,898.

* cited by examiner

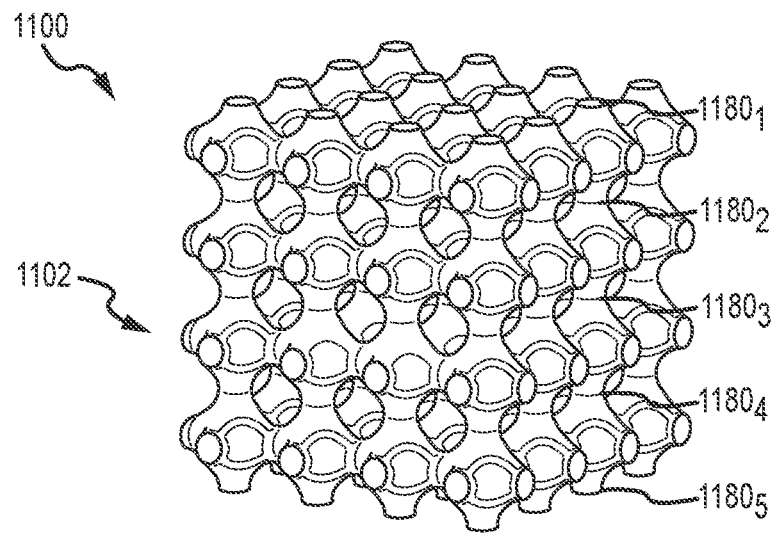
FIG.11A
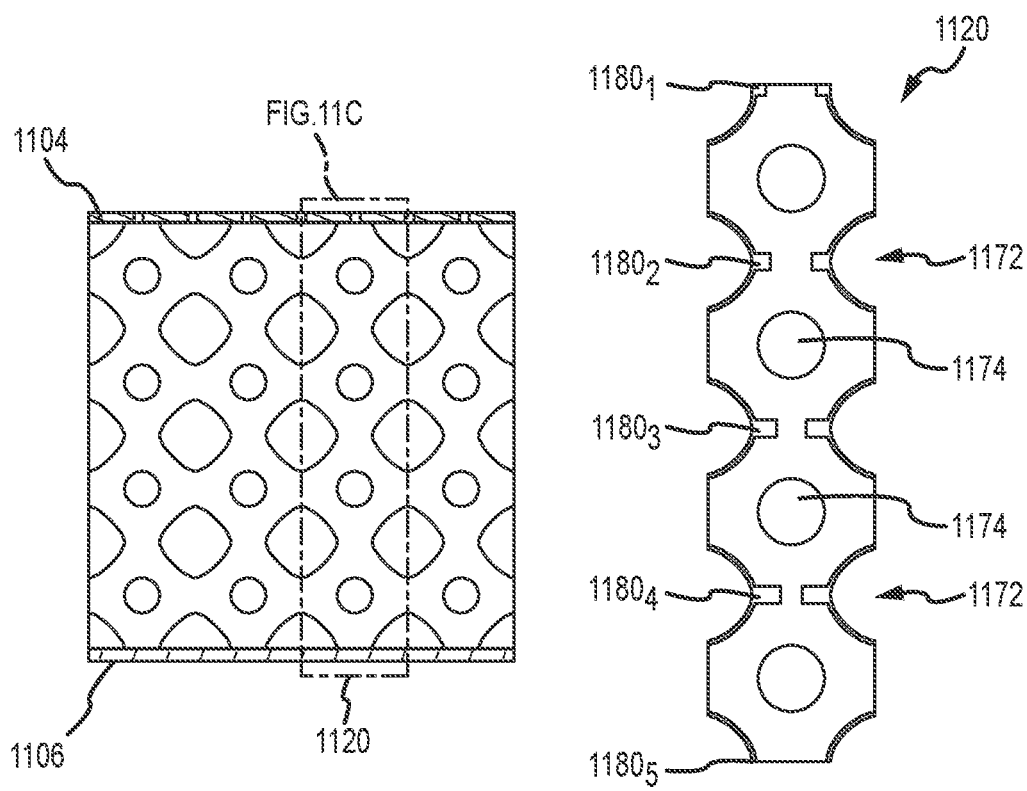
FIG.11B
FIG.11C

UNIT CELL RESONATOR NETWORKS FOR TURBOMACHINERY BYPASS FLOW STRUCTURES

FIELD

The present disclosure relates generally to attenuation structures for reducing acoustic noise and, more particularly, to acoustic panels for reducing noise generated within engines or propulsion systems.

BACKGROUND

Acoustic panels may be used for noise suppression or attenuation in aerospace applications and other fields. The panels typically comprise two skin surfaces that sandwich between them at least one layer of a core material or structure. The two skins and the core structure may be bonded together or cured or otherwise formed together, but mechanical fastening is also used in some applications. The core structure ties the skins together structurally and can form a very rigid, efficient and lightweight structure for noise suppression or attenuation useful in aerospace applications, such as for example, in cabins or other areas of passenger aircraft. The panels may be given acoustic properties by perforating one skin (typically an air washed side of the panel) with specifically sized volumes. This enables the cells of the core structure to act like individual Helmholtz or quarter-wave resonators that attenuate a certain tone or tones, at specific or broadband frequencies or wavelengths, of noise generated outside an aircraft—e.g., by an engine or airflow over the fuselage—or noise generated within an aircraft—e.g., by personal audio/visual equipment, galley equipment or air management equipment. These acoustic panels, where the resonators are sandwiched by a single pair of skins, are typically referred to as single-degree of freedom (SDOF) liners or panels. Acoustic panels may also be constructed as double-degree of freedom (DDOF) or multiple-degree of freedom (MDOF) liners or panels, comprising two or more layers of resonators, that provide broader frequency noise reduction.

SUMMARY

An exit guide vane for a propulsion system is disclosed. In various embodiments, the exit guide vane includes a suction-side facesheet; a pressure-side facesheet; and an acoustic attenuation structure disposed between the suction-side facesheet and the pressure-side facesheet, the acoustic attenuation structure including a periodic structure having a first unit cell, the first unit cell having a first central body and a first axial tube disposed on the first central body and a second axial tube disposed on the first central body, opposite the first axial tube, each of the first axial tube and the second axial tube being in fluid communication with one another through the first central body.

In various embodiments, the first unit cell includes a first lateral tube, disposed on and in fluid communication with the first central body, and a second lateral tube, opposite the first lateral tube and disposed on and in fluid communication with the first central body. In various embodiments, the first unit cell includes a third lateral tube, disposed on and in fluid communication with the first central body, and a fourth lateral tube, opposite the third lateral tube and disposed on and in fluid communication with the first central body. In various embodiments, each of the first axial tube, the second axial tube, the first lateral tube, the second lateral tube, the third lateral tube and the fourth lateral tube are in fluid communication with each other via the first central body. In various embodiments, at least one of the first axial tube, the second axial tube, the first lateral tube, the second lateral tube, the third lateral tube or the fourth lateral tube is at least partially sealed via a septum configured to restrict a flow of fluid therethrough.

In various embodiments, a second unit cell is interconnected to the first unit cell, the second unit cell having a second central body and a pair of axial tubes and a pair of lateral tubes disposed on and in fluid communication with the second central body. In various embodiments, the first lateral tube of the first unit cell is interconnected to one of the pair of lateral tubes of the second unit cell. In various embodiments, a third unit cell is interconnected to the first unit cell and a fourth unit cell is interconnected to the second unit cell and to the third unit cell, each of the first unit cell, the second unit cell, the third unit cell and the fourth unit cell being comprised within a layer of unit cells.

A bifurcation structure for a propulsion system is disclosed. In various embodiments, the bifurcation structure includes a first-side facesheet; a second-side facesheet; and an acoustic attenuation structure disposed between the first-side facesheet and the second-side facesheet, the acoustic attenuation structure including a periodic structure having a first unit cell, the first unit cell having a first central body and a first axial tube disposed on the first central body and a second axial tube disposed on the first central body, opposite the first axial tube, each of the first axial tube and the second axial tube being in fluid communication with one another through the first central body.

In various embodiments, the first unit cell includes a first lateral tube, disposed on and in fluid communication with the first central body, and a second lateral tube, opposite the first lateral tube and disposed on and in fluid communication with the first central body. In various embodiments, the first unit cell includes a third lateral tube, disposed on and in fluid communication with the first central body, and a fourth lateral tube, opposite the third lateral tube and disposed on and in fluid communication with the first central body. In various embodiments, each of the first axial tube, the second axial tube, the first lateral tube, the second lateral tube, the third lateral tube and the fourth lateral tube are in fluid communication with each other via the first central body. In various embodiments, at least one of the first axial tube, the second axial tube, the first lateral tube, the second lateral tube, the third lateral tube or the fourth lateral tube is partially sealed via a septum configured to partially restrict a flow of fluid therethrough.

In various embodiments, a second unit cell is interconnected to the first unit cell, the second unit cell having a second central body and a pair of axial tubes and a pair of lateral tubes disposed on and in fluid communication with the second central body. In various embodiments, a third unit cell is interconnected to the first unit cell and a fourth unit cell is interconnected to the second unit cell and to the third unit cell, each of the first unit cell, the second unit cell, the third unit cell and the fourth unit cell being comprised within a layer of unit cells.

A noise attenuation panel for a structure within a propulsion system is disclosed. In various embodiments, the noise attenuation panel includes a first periodic structure having a first unit cell, a second unit cell, a third unit cell and a fourth unit cell, wherein each of the first unit cell, the second unit cell, the third unit cell and the fourth unit cell includes a central body interconnected via a plurality of lateral tubes extending from the central body, the first periodic structure forming a first lateral layer of unit cells and a facesheet and a back plate configured to enclose the first periodic structure.

In various embodiments, the noise attenuation panel further includes a second periodic structure, the second periodic structure forming a second lateral layer of unit cells interconnected to the first lateral layer of unit cells. In various embodiments, the second lateral layer of unit cells is interconnected to the first lateral layer of unit cells via a plurality of axial tubes. In various embodiments, the first lateral layer of unit cells and the second lateral layer of unit cells each comprise a plurality of volumes extending axially between adjacent pairs of unit cells that comprise the first lateral layer of unit cells and the second lateral layer of unit cells and wherein the plurality of volumes defines a space exterior to the first lateral layer of unit cells, the space being either partially restricted or completely restricted by a volume filler. In various embodiments, the plurality of volumes includes a first volume having a first volume size and a second volume having a second volume size different from the first volume size.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

FIGS. 11A, 11B and 11C are schematic illustrations of a noise attenuation panel of the present disclosure, in accordance with various embodiments;

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
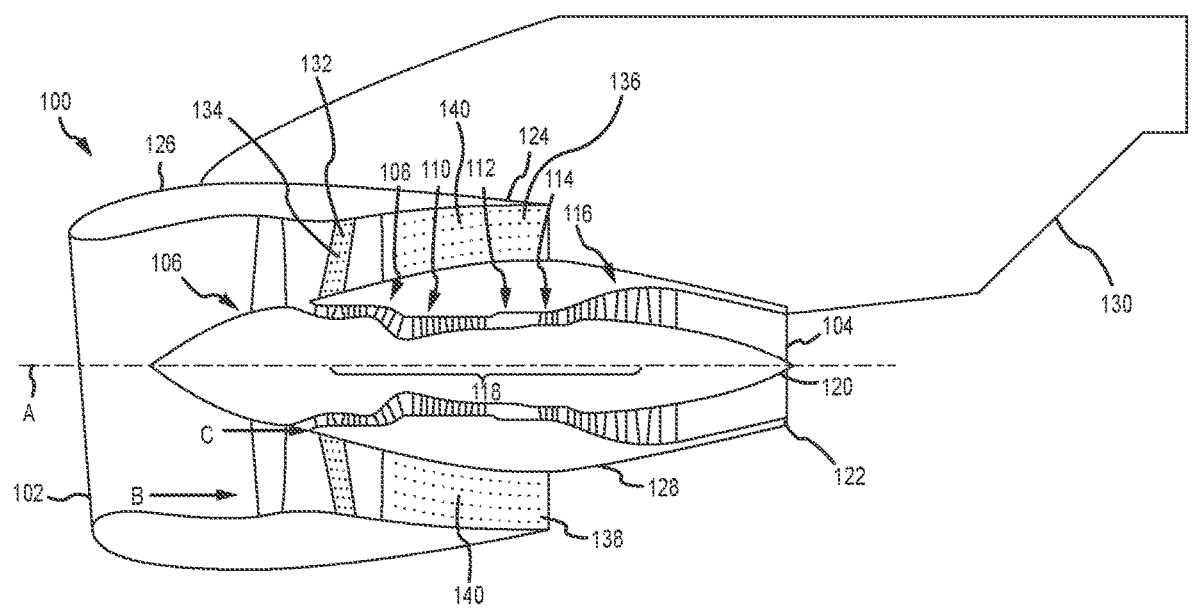
FIG. 1 is a schematic representation of a gas turbine engine used as a propulsion system on an aircraft, in accordance with various embodiments.

Referring now to FIG. 1, a side cutaway illustration of a gas turbine engine 100 is provided. The gas turbine engine 100 extends along an axial centerline A between an airflow inlet 102 and a core exhaust system 104. The gas turbine engine 100 includes a fan section 106, a low-pressure compressor section 108 (LPC), a high-pressure compressor section 110 (HPC), a combustor section 112, a high-pressure turbine section 114 (HPT) and a low-pressure turbine section (LPT) 116. The various engine sections are typically arranged sequentially along the axial centerline A. In various embodiments, the low-pressure compressor section 108 (LPC), the high-pressure compressor section 110 (HPC), the combustor section 112, the high-pressure turbine section 114 (HPT) and the low-pressure turbine section 116 (LPT) form a core 118 (or an engine core) of the gas turbine engine 100.

Air enters the gas turbine engine 100 through the airflow inlet 102, and is directed through the fan section 106 and into a core gas flow path C and a bypass gas flow path B. The air within the core gas flow path C may be referred to as "core air." The air within the bypass gas flow path B may be referred to as "bypass air." The core air is directed through the low-pressure compressor section 108, the high-pressure compressor section 110, the combustor section 112, the high-pressure turbine section 114 and the low-pressure turbine section 116 and exits the gas turbine engine 100 through the core exhaust system 104, which includes an exhaust center body 120 surrounded by an exhaust nozzle 122. Within the combustor section 112, fuel is injected into and mixed with the core air and ignited to provide a hot airstream that drives the turbine sections. The bypass air is directed through the bypass gas flow path B, and out of the gas turbine engine 100 through a bypass exhaust nozzle 124 to provide forward engine thrust. The bypass air may also or alternatively be directed through a thrust reverser, positioned, for example, at or proximate the bypass exhaust nozzle 124, to provide reverse engine thrust. A fan nacelle 126 is typically employed to surround the various sections of the gas turbine engine 100 and a core nacelle 128 is typically employed to surround the various sections of the core 118. The gas turbine engine 100 is typically secured to an airframe (e.g., a fuselage or a wing) via a pylon 130.

Still referring to FIG. 1, various acoustic liners (or acoustic attenuation panels) may be disposed at various locations of the gas turbine engine 100. For example, in various embodiments, an exit guide vane 132 (or a plurality of exit guide vanes) may be disposed between the fan nacelle 126 and the core nacelle 128 and configured to turn the flow of air in the bypass gas flow path B downstream of the fan section 106. In various embodiments, an exit guide vane acoustic liner 134 may be comprised within or be part of the exit guide vane 132. Similarly, a bifurcation structure, such as, an upper bifurcation structure 136 or a lower bifurcation structure 138 may be disposed between the fan nacelle 126 and the core nacelle 128 and configured to accommodate electrical wiring or fluid lines to or from the various sections or components that comprise the core 118 of the gas turbine engine 100. In various embodiments, a bifurcation section acoustic liner 140 may be comprised within or be part of one or both of the upper bifurcation structure 136 and the lower bifurcation structure 138. Note that while the disclosure focuses on the application of acoustic panels or liners or other noise attenuation configurations to gas turbine engines, the disclosure is also applicable to other propulsion systems, such as, for example, hybrid electric engines that include a nacelle, a fan, and possibly an exit guide vane or a bifurcation structure, but no core or engine core as described above. Thus, the term propulsion system should be considered broadly and not limited to gas turbine engines.

Figure 2A:
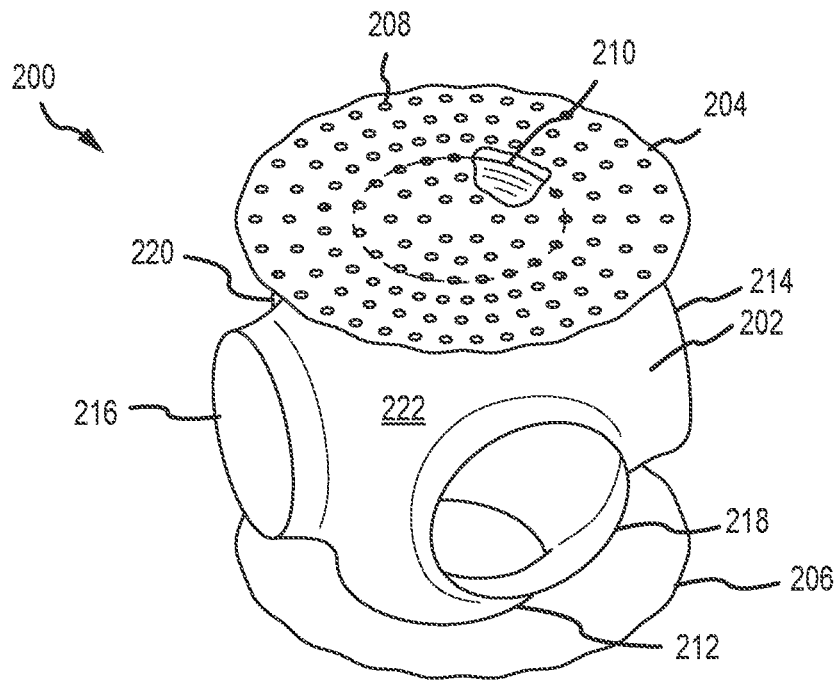
FIGS. 2A and 2B are schematic illustrations of noise attenuation panels for use in a gas turbine engine, in accordance with various embodiments.
Figure 2B:
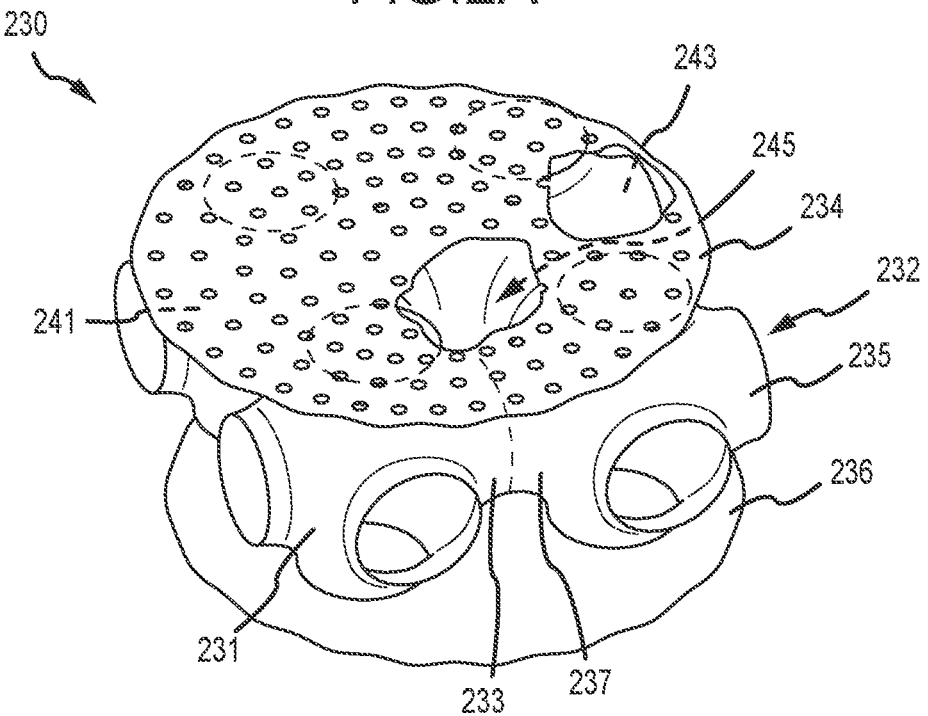

Referring now to FIGS. 2A and 2B, schematic views of a noise attenuation panel (or an acoustic attenuation structure) are provided; the noise attenuation panels described and illustrated in these figures are oversimplified to explain various features of the panels. Referring specifically to FIG. 2A, a noise attenuation panel 200 is illustrated having a unit cell 202 sandwiched between a facesheet 204 and a back plate 206. The facesheet 204 typically includes a plurality of perforations or openings 208 to communicate acoustic waves or energy to the unit cell 202, which acts as a resonator to damp or attenuate the acoustic waves or energy. The back plate 206 typically is non-perforated and, together with the facesheet 204, provides a support structure for the unit cell 202. In various embodiments, and as will be described in further detail below, the unit cell 202 includes a pair of axial tubes, including, for example, a first axial tube 210 connected to the facesheet 204 and a second axial tube 212, opposite the first axial tube 210 (e.g., the first axial tube 210 being axially aligned with the second axial tube 212), connected to the back plate 206. In various embodiments, the unit cell 202 further includes a first pair of lateral tubes, such as, for example, a first lateral tube 214 and a second lateral tube 216, opposite the first lateral tube 214 (e.g., the first lateral tube 214 being axially aligned with the second lateral tube 216). In various embodiments, the unit cell 202 further includes a second pair of lateral tubes, such as, for example, a third lateral tube 218 and a fourth lateral tube 220, opposite the third lateral tube 218 (e.g., the third lateral tube 218 being axially aligned with the fourth lateral tube 220). As also described further below, while the various tubes (or tubular structures) are illustrated in FIG. 2A as having an opening into a central body 222 of the unit cell 202, the various tubes may be connected to the tubes of adjacent unit cells (see, e.g., FIG. 2B) or may be completely or partially closed (or sealed) via a wall or a mesh, which may include a perforated or a similar structure, the wall or the mesh being configured to block or partially restrict, respectively, a flow of fluid therethrough.

Further, it is noted that while the unit cell 202 may comprise a structure that exhibits various degrees of symmetry (e.g., a cubic symmetry typical of a Schwarz P surface), the various tubes or central bodies among a plurality of interconnected unit cells may be sized or shaped identically or exhibit different sizes or shapes among such plurality of interconnected unit cells. Note also that in various embodiments, each of the first axial tube 210, the second axial tube 212, the first lateral tube 214, the second lateral tube 216, the third lateral tube 218 and the fourth lateral tube 220 are in fluid communication with each other via the central body 222

Referring now to FIG. 2B, with continued reference to FIG. 2A, a noise attenuation panel 230 is illustrated having a plurality of unit cells 232, each having the shape of the unit cell 202, interconnected and sandwiched between a facesheet 234 and a back plate 236. In various embodiments, the plurality of unit cells 232 is formed by interconnecting adjacent lateral tubes of adjacent unit cells together. For example, as illustrated in FIG. 2B, a first unit cell 231 having a first lateral tube 233 may be interconnected to a second unit cell 235 having a second lateral tube 237 by interconnecting the first lateral tube 233 to the second lateral tube 237. In similar fashion, a third unit cell 241 and a fourth unit cell 243 may be interconnected to each other and to, respectively, the first unit cell 231 and to the second unit cell 235. In such fashion, a periodic structure having a plurality of resonators configured to damp or attenuate acoustic waves or energy results. As described in further detail below, note the periodic structure of the plurality of unit cells 232, interconnected as described, results in a volume 245 at the center of the periodic structure and extending axially between the facesheet 234 and the back plate 236. In various embodiments, the volume 245 may be sized to damp or attenuate acoustic waves or energy at different frequencies as do the plurality of unit cells 232.

Figure 3A:
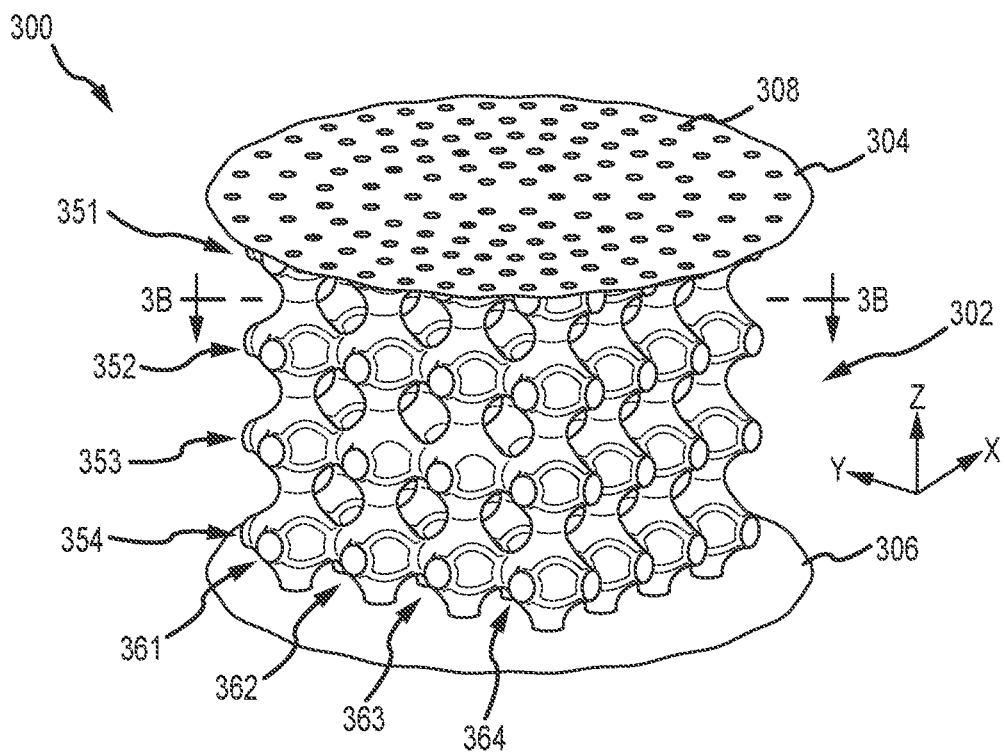
FIGS. 3A and 3B are schematic illustrations of noise attenuation panels for use in a gas turbine engine, in accordance with various embodiments.
Figure 3B:
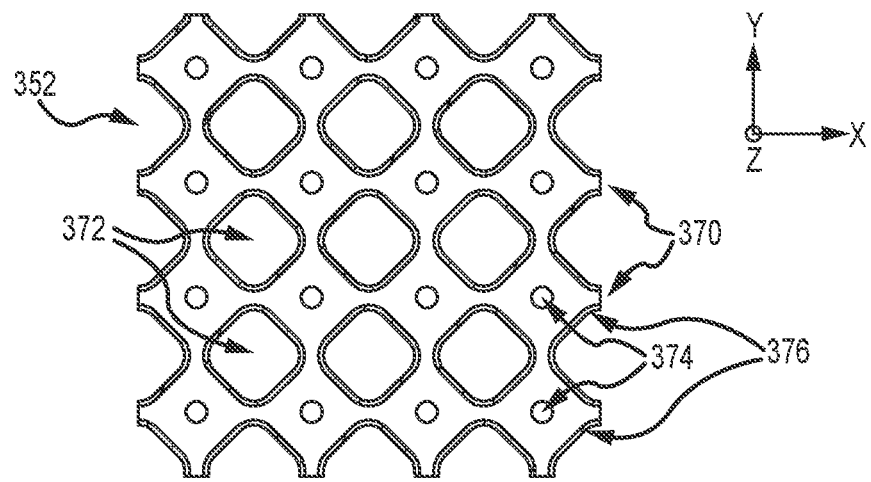

Referring now to FIGS. 3A and 3B, schematic views of a noise attenuation panel 300, similar to the noise attenuation panels described above, are provided. The noise attenuation panel 300 is illustrated as having a plurality of unit cells 302 sandwiched between a facesheet 304 and a back plate 306. The facesheet 304 typically includes a plurality of perforations or openings 308 to communicate acoustic waves or energy to the plurality of unit cells 302, which acts as a resonator to damp or attenuate the acoustic waves or energy. The back plate 306 typically is non-perforated and, together with the facesheet 304, provides a support structure for the plurality of unit cells 302. Each member of the plurality of unit cells 302 has properties and characteristics similar to the unit cell 202 and to the plurality of unit cells 232 described above with reference to FIGS. 2A and 2B, and so such properties and characteristics, including the manner of interconnecting the unit cells within the plurality of unit cells 302 is not repeated here.

One difference between the embodiments described with reference to FIGS. 2A and 2B and those described with reference to FIGS. 3A and 3B is the layered structure exhibited by the noise attenuation panel 300. For example, while the noise attenuation panel 230 described above with reference to FIG. 2B comprises a single layer of unit cells (or a first periodic structure), the noise attenuation panel 300 comprises a plurality of layers of unit cells, including, for example, a first lateral layer of unit cells 351 (or a first periodic structure), a second lateral layer of unit cells 352 (or a second periodic structure), a third lateral layer of unit cells 353 (or a third periodic structure) and a fourth lateral layer of unit cells 354 (or a fourth periodic structure). In various embodiments, each lateral layer of unit cells exhibits an N×M structure of unit cells, where N is the number of unit cells in a first direction (e.g., a first unit cell, a second unit cell . . . an Nth unit cell in the x-direction) and M is the number of unit cells in a second direction (e.g., a first unit cell, a second unit cell . . . an Mth unit cell in the y-direction). A similar arrangement applies to the layers of unit cells in the axial or the z-direction, which may be P in number, and include a first axial layer of unit cells 361 (or a first periodic structure), a second axial layer of unit cells 362 (or a second periodic structure), a third axial layer of unit cells 363 (or a third periodic structure) and a fourth axial layer of unit cells 364 (or a fourth periodic structure). Note that while each of M, N and P equals four (4) in FIGS. 3A and 3B, there is no requirement that M, N and P equal one another in any particular noise attenuation panel or embodiment thereof.

With primary reference now to FIG. 3B, and with continued reference to FIG. 3A, the second lateral layer of unit cells 352 is illustrated from an overhead (or axial or z-direction) perspective. Given the generally periodic structure of the noise attenuation panel 300, the second lateral layer of unit cells 352 may be considered representative of any of the lateral or axial layers of unit cells identified above. The layer of unit cells comprises an N×M plurality of unit cells 370 interconnected together (via a plurality of lateral tubes as described above) and an (N−1)×(M−1) plurality of volumes 372 disposed between the unit cells. The layer also comprises an N×M plurality of axial tubes 374 that extend into an N×M plurality of central bodies 376 of the unit cells (e.g., a first central body, a second central body . . . an N×Mth central body). As discussed further below, one or more of the individual members of the (N−1)×(M−1) plurality of volumes 372, the N×M plurality of axial tubes 374 and the plurality of lateral tubes may be either completely or partially sealed or restricted to tune the noise attenuation panel 300 to attenuate various frequencies of the acoustic energy spectrum that the noise attenuation panel 300 is being subjected during operation.

Figure 4A:
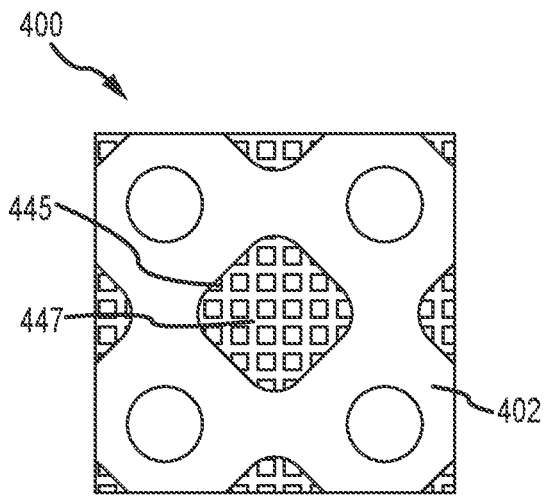
FIGS. 4A and 4B are schematic illustrations of noise attenuation panels for use in a gas turbine engine, in accordance with various embodiments.
Figure 4B:
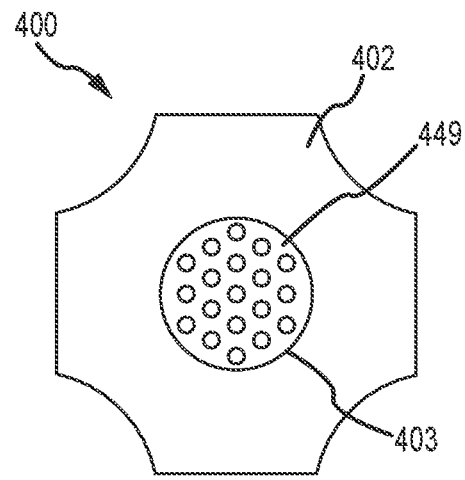

Referring now to FIGS. 4A and 4B, sectional schematic views of a portion of a noise attenuation panel 400, similar to any of the noise attenuation panels described above, are provided. Referring to FIG. 4A, for example, a schematic view of a volume 445, similar to the volume 245 illustrated in FIG. 2B or one of the (N−1)×(M−1) plurality of volumes 372 illustrated in FIG. 3B, is provided. As described above, the volume 445 is defined by a plurality of unit cells 402 that are interconnected via the interconnecting of lateral or axial tubes associated with the plurality of unit cells 402. As illustrated, the volume 445 is partially restricted via a volume filler 447, disposed throughout the space exterior to the unit cells, that is configured to act as a bulk absorber to reduce or restrict the flow of air through the volume 445. Note that in various embodiments, the volume filler 447 may comprise a plurality of layers of mesh-like materials, perforated structures or even acoustic foams so the resulting structure exhibits properties of a bulk material or a foam that either partially restricts or completely restricts the flow of air (or acoustic waves) within the space that is exterior to the plurality of unit cells 402. The partial or complete restriction provided by the volume filler 447 facilitates additional tuning of the noise attenuation panel 400 to attenuate over a broader frequency range of the acoustic energy spectrum. Similarly, referring to FIG. 4B, a schematic view of an isolated one of the plurality of unit cells 402, similar to one of the plurality of unit cells 232 illustrated in FIG. 2B or one of the plurality of unit cells 302 illustrated in FIG. 3A, is provided. As described above, the isolated one of the plurality of unit cells 402 includes a tube 403, either lateral or axial, depending on the orientation of the unit cell. As illustrated, the tube 403 is partially restricted via a tube mesh 449, which may include properties similar to those identified for the volume filler 447, that is configured to reduce or restrict the flow of air through the tube 403. The partial restriction provided by the tube mesh 449 facilitates tuning the noise attenuation panel 400 to attenuate specific frequencies of the acoustic energy spectrum the noise attenuation panel 400 is being subjected to during operation.

Figure 5A:
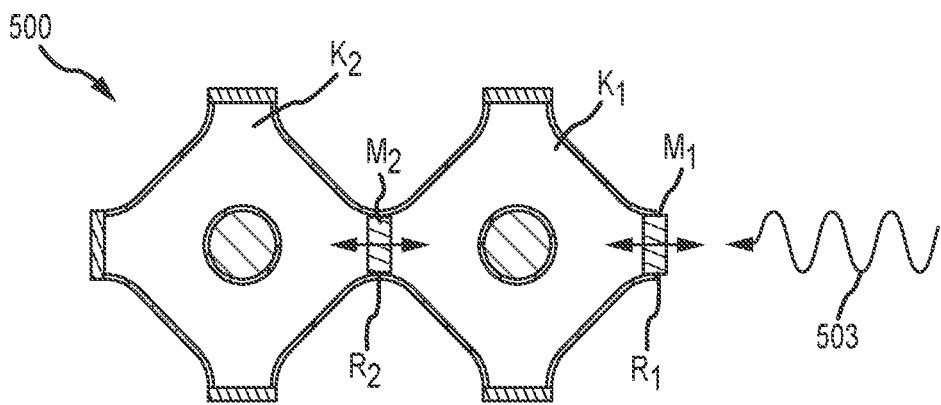
FIGS. 5A and 5B are schematic illustrations of noise attenuation panels for use in a gas turbine engine, in accordance with various embodiments.
Figure 5B:
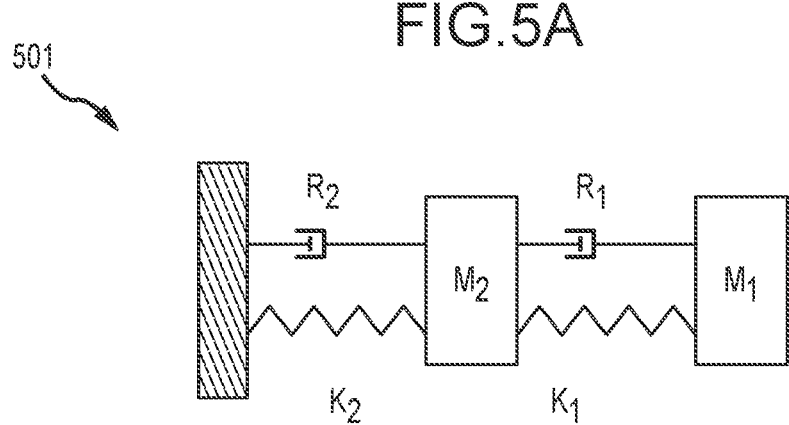

Referring now to FIGS. 5A and 5B, a model 501 that facilitates mathematical design of a noise attenuation panel 500 is described. As illustrated, the model 501 approximates the behavior or response of the noise attenuation panel 500 via a dynamical system that includes (i) a mass (e.g., $M_1$ and $M_2$) that represents the mass of air associated with an acoustic wave 503 that oscillates within a tube of a unit cell; (ii) a stiffness (e.g., $K_1$ and $K_2$) that represents the density of the air within the central body of the unit cell; and (iii) a dashpot (e.g., $R_1$ and $R_2$) that represents the energy dissipation associated with the air moving in the tubes. The dynamical system facilitates development of a set of differential equations that may be solved to approximate the behavior or response of the noise attenuation panel 500. The dynamical system may also account for complete or partial restriction of the various axial or lateral tubes associated with the unit cell. While the model 501 illustrated in FIG. 5B is representative of a simple two unit-cell system as illustrated in FIG. 5A, such models may be extended to arbitrarily large numbers of unit cells.

Figure 6A:
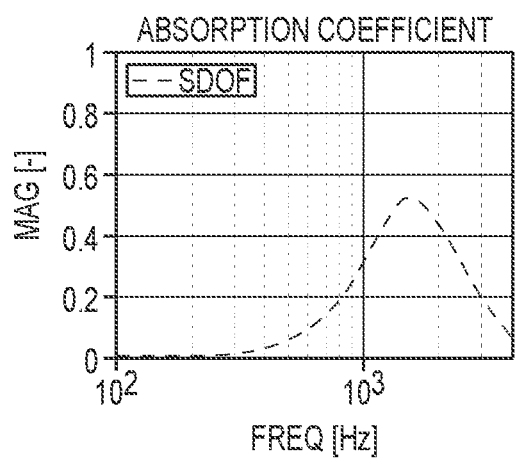
FIGS. 6A, 6B, 6C and 6D are schematic views of the noise attenuation panels of the present disclosure and performance graphs illustrating improvements over more conventional single-degree of freedom cell-based structures, in accordance with various embodiments.
Figure 6C:
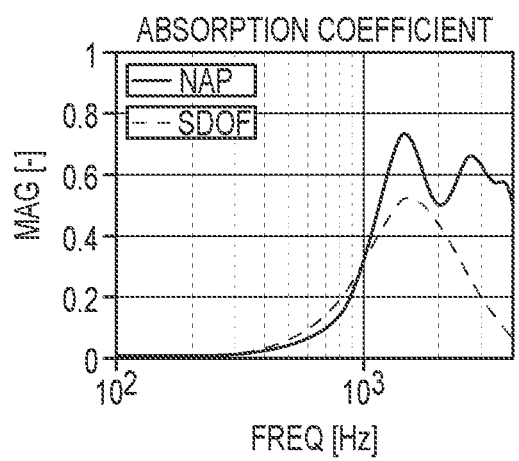
Figure 6B:
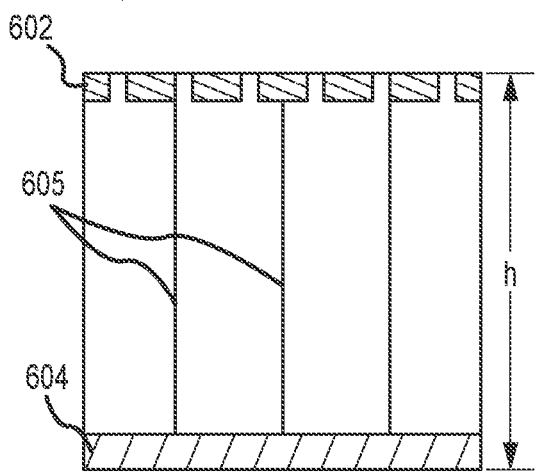
Figure 6D:
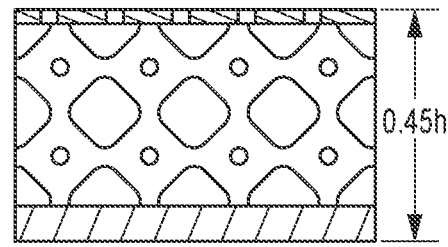

Referring now to FIGS. 6A, 6B, 6C and 6D, computational results are provided that illustrate various benefits of the noise attenuation panels presented and described in this disclosure. Referring to FIGS. 6A and 6B, a graph 681 showing absorption coefficient as a function of frequency is illustrated for a conventional single degree of freedom noise attenuation panel 680 (SDOF) having a facesheet 602 and a back plate 604 defining a height (h) of the panel, filled with a honeycomb structure 605. By way of comparison, FIGS. 6C and 6D illustrate a graph 683 showing absorption coefficient as a function of frequency for a noise attenuation panel 682 (NAP) having the same facesheet and a back plate as employed in the conventional single-degree of freedom noise attenuation panel 680. As indicated in the graph 683, the noise attenuation panel 682 provides a greater magnitude of noise attenuation at the design frequency and an extended attenuation bandwidth with more broadband absorption at higher frequencies, than the conventional single-degree of freedom noise attenuation panel 680 having a height (h) less than 50% of the height (h) of the conventional panel, thus providing a substantial space and potential weight savings and an increase in attenuation of noise over the conventional panel.

Figure 7A:
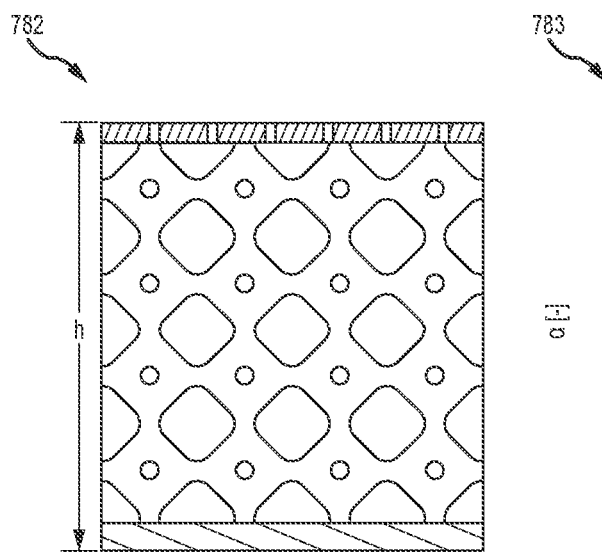
FIGS. 7A and 7B are schematic views of a noise attenuation panel of the present disclosure and a performance graph illustrating improvements over conventional single-degree of freedom cell-based structures, in accordance with various embodiments.
Figure 7B:
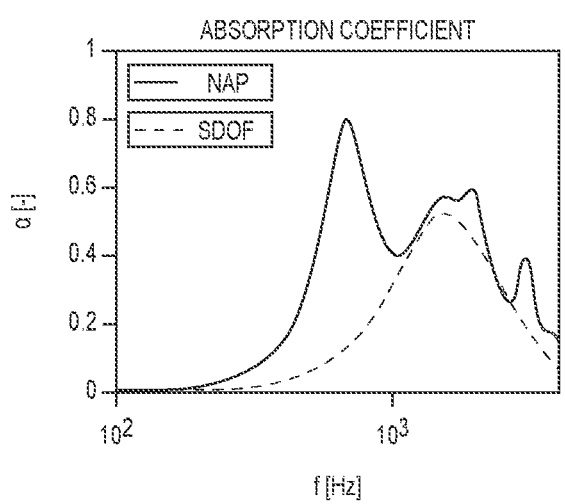

Referring now to FIGS. 7A and 7B, schematic views of a noise attenuation panel of the present disclosure and a performance graph illustrating improvements over more conventional single-degree of freedom cell-based structures are provided, in accordance with various embodiments. Referring to FIG. 7A, a noise attenuation panel 782, similar to the noise attenuation panel 682 described above, is depicted. Rather than having a height (h) equal to 0.45 h of the height (h) of the conventional single-degree of freedom noise attenuation panel 680, also described above, the noise attenuation panel 782 has a height (h) equal to the height (h) of the conventional single-degree of freedom noise attenuation panel 680. This enables a more direct comparison between the noise attenuation panel 782 and the conventional single-degree of freedom noise attenuation panel 680 when constructed to have the same dimension (e.g., the same height (h)). As illustrated in FIG. 7B, for example, a graph 783 showing absorption coefficient as a function of frequency for the noise attenuation panel 782 (NAP) and the conventional single-degree of freedom noise attenuation panel 680 (SDOF) is provided. As indicated in the graph 783, the noise attenuation panel 782 provides a greater magnitude of noise attenuation at the design frequency and at both higher and lower frequencies surrounding the design frequency than the conventional single-degree of freedom noise attenuation panel 680, thus providing an extended attenuation bandwidth with more broadband absorption at both higher and lower frequencies than the design frequency where the two noise attenuation panels share the same dimensional characteristics.

Figures 8A, 8B:
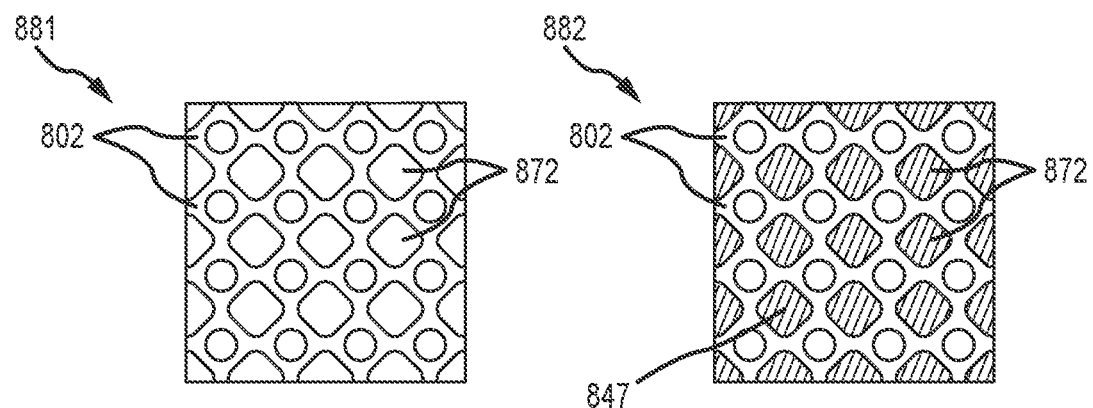
FIGS. 8A, 8B and 8C are schematic views of various embodiments of the noise attenuation panels of the present disclosure illustrating relative performance, in accordance with various embodiments.
Figure 8C:
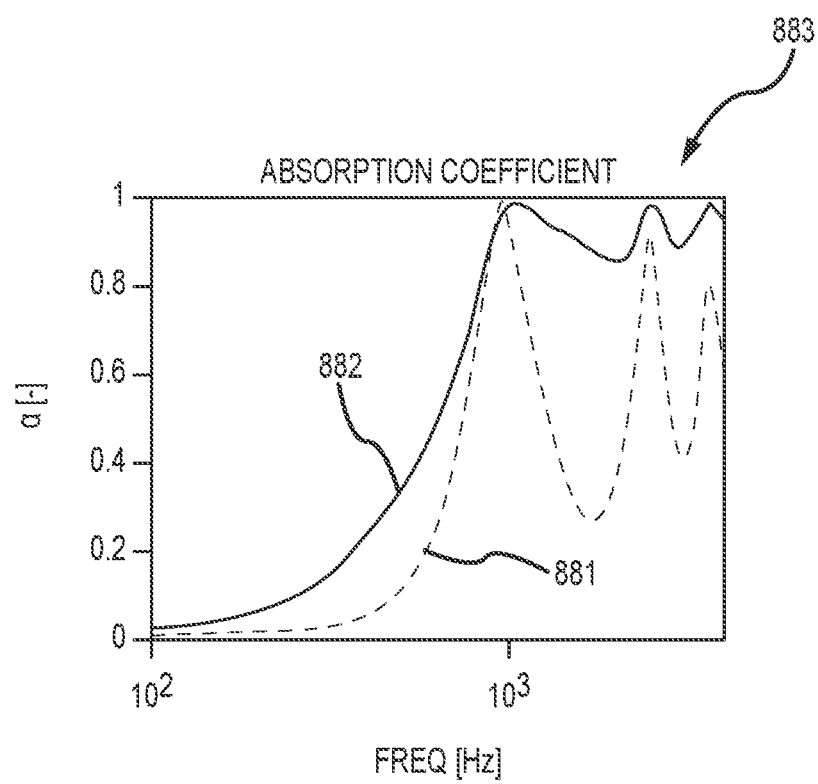

Referring now to FIGS. 8A, 8B and 8C, schematic views of various embodiments of the noise attenuation panels of the present disclosure, and a graph illustrating relative performance, are provided. Referring to FIGS. 8A and 8B, a first noise attenuation panel 881 and a second noise attenuation panel 882 are illustrated. Similar to the various embodiments above described, both the first noise attenuation panel 881 and the second noise attenuation panel 882 include a plurality of unit cells 802 and a plurality of volumes 872 defined by the spaces in between the individual unit cells comprising the plurality of unit cells 802. The only difference between the first noise attenuation panel 881 and the second noise attenuation panel 882 is each of the plurality of volumes 872 in the second noise attenuation panel 882 is partially restricted or completely restricted via a volume filler 847, similar to the volume filler 447 described above. Note that where complete restriction is provided, the volume filler 847 may be completely solid—e.g., the space exterior to the plurality of unit cells 802 is completely filled with material. Referring now to FIG. 8C, a graph 883 showing absorption coefficient as a function of frequency for the first noise attenuation panel 881 and the second noise attenuation panel 882 is provided. As depicted in the graph 883, the second noise attenuation panel 882 exhibits an extended attenuation bandwidth with greater broadband absorption throughout the range of frequencies, which illustrates the enhanced noise absorption characteristics provided by the volume filler 847 used to partially restrict the flow of air through each of the plurality of volumes 872.

Figure 9A:
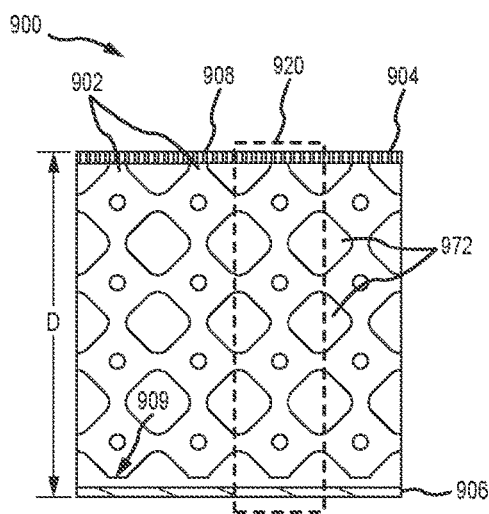
FIGS. 9A, 9B and 9C are schematic illustrations of a noise attenuation panel of the present disclosure, in accordance with various embodiments.
Figure 9B:
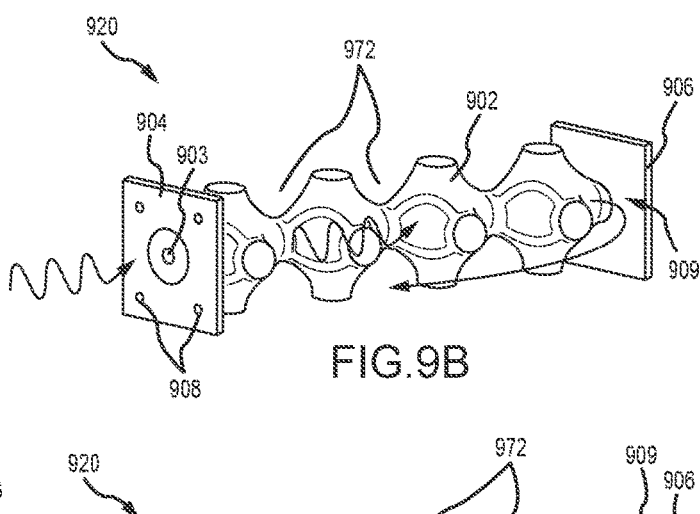
Figure 9C:
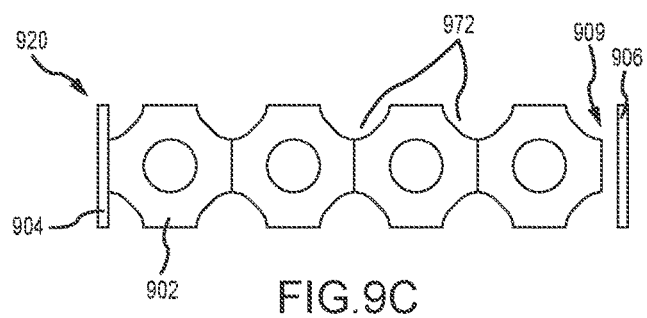

Referring now to FIGS. 9A, 9B and 9C, schematic illustrations of a noise attenuation panel 900 are provided, in accordance with various embodiments. Similar to the various embodiments described above, the noise attenuation panel 900 includes a plurality of unit cells 902 sandwiched between a facesheet 904 and a back plate 906. The facesheet 904 typically includes a plurality of perforations or openings 908 to communicate acoustic waves or energy to the plurality of unit cells 902. Each member of the plurality of unit cells 902 has properties and characteristics similar to the unit cell 202 and to the plurality of unit cells 232 described above with reference to FIGS. 2A and 2B, and so such properties and characteristics, including the manner of interconnecting the unit cells within the plurality of unit cells 902 is not repeated here. In various embodiments, the noise attenuation panel 900 includes a gap 909 adjacent the back plate 906 at each of the unit cells positioned adjacent the back plate 906, where the gap 909 provides an opening or spacing away from the back plate 906, thereby allowing fluid communication between the interior of the unit cells positioned adjacent the back plate 906 and the exterior of the unit cells comprising the plurality of unit cells 902.

Referring more particularly now to FIGS. 9B and 9C, and with continued reference to FIG. 9A, a panel section 920 of the noise attenuation panel 900 is illustrated as comprising a single row of unit cells sandwiched between the facesheet 904 and the back plate 906. As illustrated, during operation, acoustic waves or energy impinge upon the facesheet 904 and enter the first unit cell of the panel section 920 via a perforation 903 (or via a plurality of such perforations). The acoustic waves or energy then traverse the plurality of unit cells 902 where acoustic attenuation occurs as described above. In various embodiments, the acoustic waves or energy then exit the interiors of the plurality of unit cells at the gap 909 adjacent the back plate 906. Once exited, the acoustic waves or energy then traverse back to the facesheet 904 via a plurality of volumes 972 defined by the spaces in between the individual unit cells comprising the plurality of unit cells 902. The acoustic waves or energy then may exit the facesheet 904 via the plurality of perforations or openings 908. Note that in various embodiments, one or more or even all of the plurality of perforations or openings 908 may be closed to alter the frequency range of attenuation. In the case where all of the plurality of perforations or openings 908 is completely closed or sealed, it is possible to shift the peak absorption frequency to a lower frequency range than would otherwise occur. In such case, the volume of space exterior to the plurality of unit cells 902—i.e., the plurality of volumes 972—acts as a closed volume or resonator.

Figure 10A:
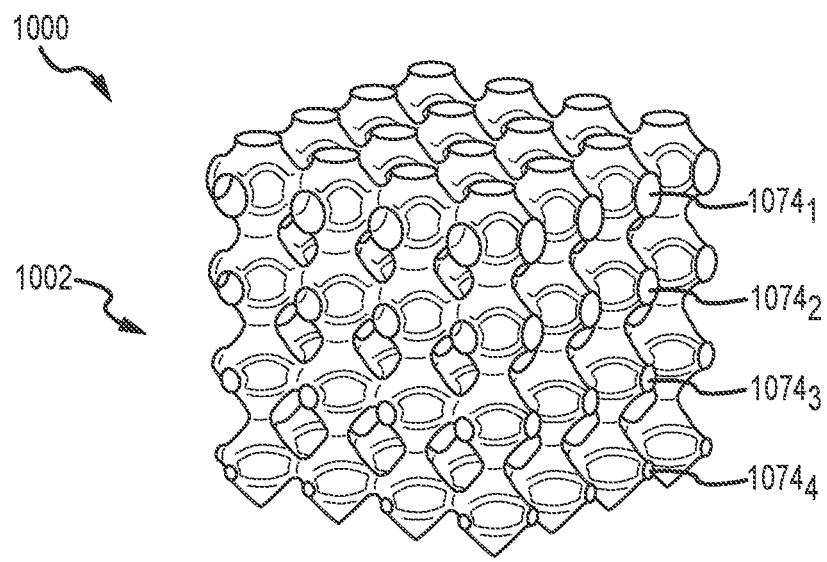
FIGS. 10A, 10B and 10C are schematic illustrations of a noise attenuation panel of the present disclosure, in accordance with various embodiments.
Figure 10B:
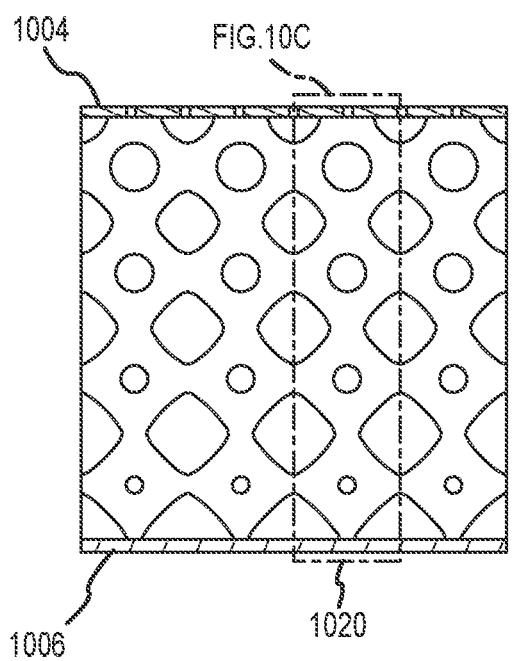
Figure 10C:
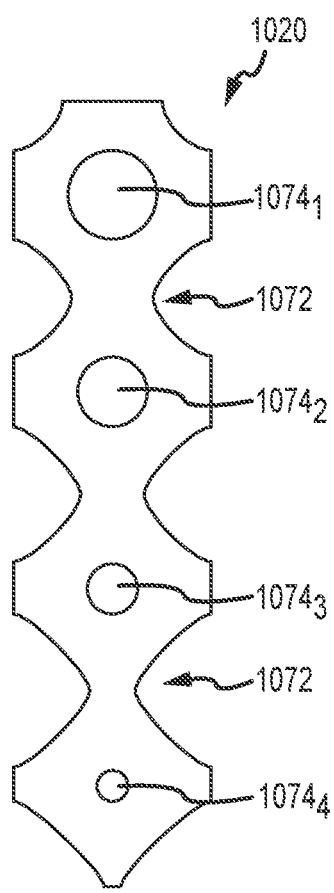

Referring now to FIGS. 10A, 10B and 10C, schematic illustrations of a noise attenuation panel 1000 are provided, in accordance with various embodiments. Similar to the various embodiments described above, the noise attenuation panel 1000 includes a plurality of unit cells 1002 sandwiched between a facesheet 1004 and a back plate 1006. The facesheet 1004 typically includes a plurality of perforations or openings configured to communicate acoustic waves or energy to the plurality of unit cells 1002. Each member of the plurality of unit cells 1002 has properties and characteristics similar to the unit cell 202 and to the plurality of unit cells 232 described above with reference to FIGS. 2A and 2B, and so such properties and characteristics, including the manner of interconnecting the unit cells within the plurality of unit cells 1002 is not repeated here. In various embodiments, various members of the plurality of unit cells 1002 exhibit different sizes and, particular to the illustrated embodiment, different sized tubes used to interconnect the unit cells comprising the plurality of unit cells 1002 (e.g., the axial tubes and the lateral tubes described above with reference to the various figures). For example, as illustrated with reference to a panel section 1020, a plurality of lateral tubes includes a first lateral tube $1074_1$, a second lateral tube $1074_2$, a third lateral tube $1074_3$ and a fourth lateral tube $1074_4$, with each of the lateral tubes disposed between and surrounded by various members of a plurality of volumes 1072. Each of the first lateral tube $1074_1$, the second lateral tube $1074_2$, the third lateral tube $1074_3$ and the fourth lateral tube $1074_4$ exhibit a tube size (e.g., a diameter) that decreases from a first tube size associated with the first lateral tube $1074_1$ to a fourth tube size associated with the fourth lateral tube $1074_4$. While the various lateral tubes are illustrated as having tube sizes that decrease in diameter proceeding from the facesheet 1004 to the back plate 1006, the disclosure contemplates alternative embodiments, such as, for example, tube sizes that increase in diameter proceeding from the facesheet 1004 to the back plate 1006 or tube sizes that both decrease and increase in diameter proceeding from the facesheet 1004 to the back plate 1006.

Referring now to FIGS. 11A, 11B and 11C, schematic illustrations of a noise attenuation panel 1100 are provided, in accordance with various embodiments. Similar to the various embodiments described above, the noise attenuation panel 1100 includes a plurality of unit cells 1102 sandwiched between a facesheet 1104 and a back plate 1106. The facesheet 1104 typically includes a plurality of perforations or openings configured to communicate acoustic waves or energy to the plurality of unit cells 1102. Each member of the plurality of unit cells 1102 has properties and characteristics similar to the unit cell 202 and to the plurality of unit cells 232 described above with reference to FIGS. 2A and 2B, and so such properties and characteristics, including the manner of interconnecting the unit cells within the plurality of unit cells 1102 is not repeated here. In various embodiments, various of the plurality of unit cells 1102 exhibit different sizes and, particular to the illustrated embodiment, different sized tubes used to interconnect the unit cells comprising the plurality of unit cells 1102 (e.g., the axial tubes and the lateral tubes described above with reference to the various figures). For example, as illustrated with reference to a panel section 1120, a plurality of axial tubes includes a first axial tube $1180_1$, a second axial tube $1180_2$, a third axial tube $1080_3$, and a fourth axial tube $1180_4$, with each of the axial tubes disposed between and surrounded by various members of a plurality of volumes 1172. Each of the first axial tube $1180_1$, the second axial tube $1180_2$, the third axial tube $1080_3$ and the fourth axial tube $1180_4$ exhibit a tube size (e.g., a diameter) that decreases from a first tube size associated with the first axial tube $1180_1$ to a fourth tube size associated with the fourth axial tube $1180_4$. The panel section terminates at a fifth axial tube $1180_5$, which may be positioned adjacent the back plate 1106. While the various tubes are illustrated as having tube sizes that decrease in diameter from the facesheet 1104 to the back plate 1106, the disclosure contemplates alternative embodiments, such as, for example, tube sizes that increase in diameter from the facesheet 1104 to the back plate 1106 or tube sizes that both decrease and increase in diameter from the facesheet 1104 to the back plate 1106. Further, while the illustrations show an outer diameter or exterior of each axial tube being sized the same, with the internal diameter having different sizes (e.g., progressively decreasing internal diameters from the first tube size to the fourth tube size), the disclosure contemplates size variations of the exteriors of the axial tubes to vary in the same or a similar manner as the above-described lateral tubes.

Figure 12A:
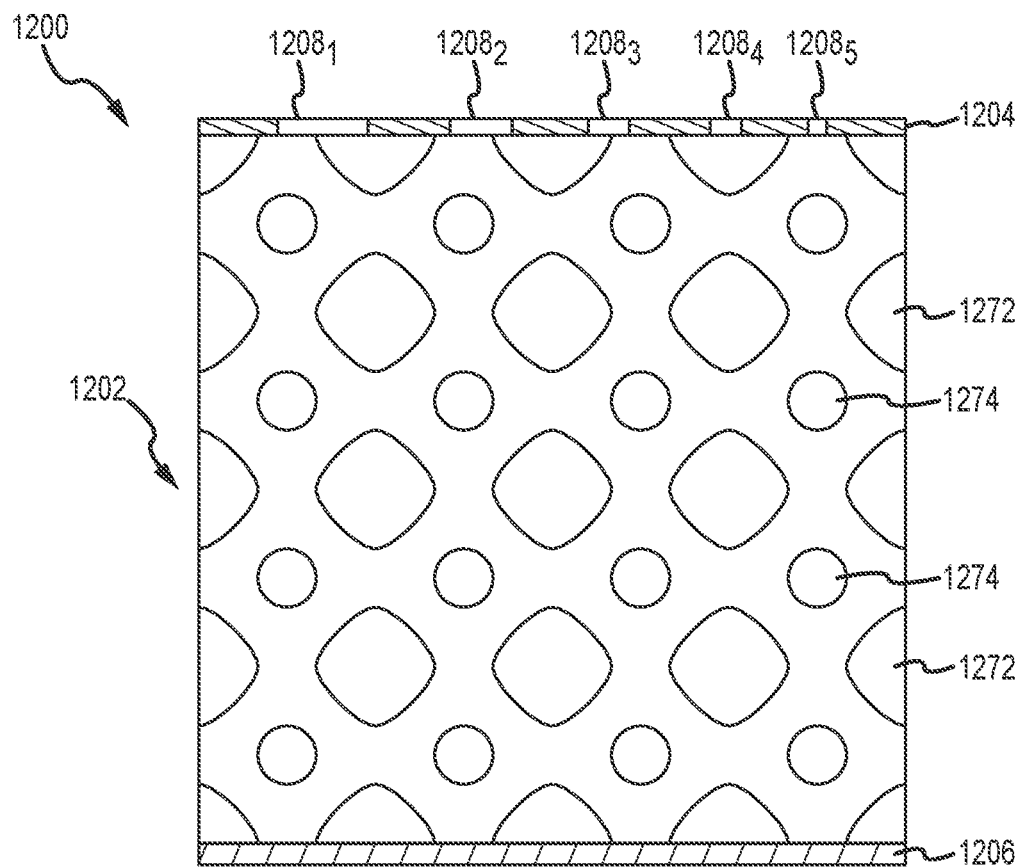
FIGS. 12A and 12B are schematic illustrations of a noise attenuation panel of the present disclosure, in accordance with various embodiments.
Figure 12B:
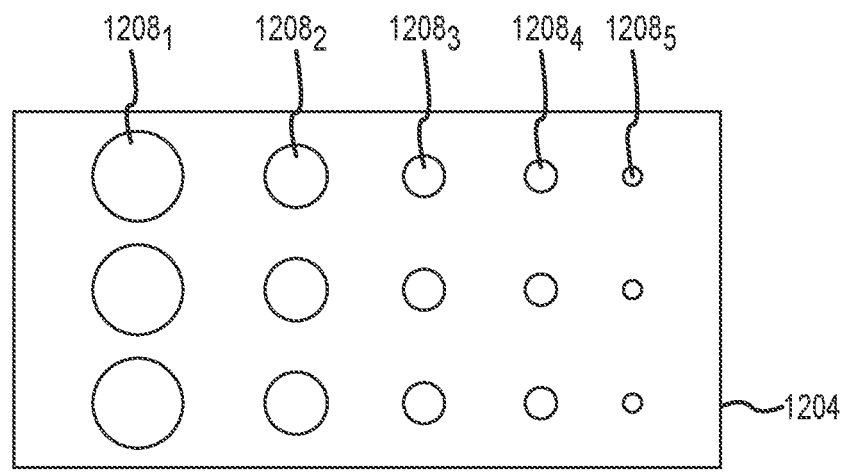

Referring now to FIGS. 12A and 12B, schematic illustrations of a noise attenuation panel 1200 are provided, in accordance with various embodiments. Similar to the various embodiments described above, the noise attenuation panel 1200 includes a plurality of unit cells 1202 sandwiched between a facesheet 1204 and a back plate 1206. The facesheet 1204 typically includes a plurality of perforations or openings configured to communicate acoustic waves or energy to the plurality of unit cells 1202. Each member of the plurality of unit cells 1202 has properties and characteristics similar to the unit cell 202 and to the plurality of unit cells 232 described above with reference to FIGS. 2A and 2B, and so such properties and characteristics, including the manner of interconnecting the unit cells within the plurality of unit cells 1202 is not repeated here. In various embodiments, the plurality of perforations or openings in the facesheet 1204 exhibit different sizes. For example, as illustrated with reference to FIGS. 12A and 12B, the facesheet 1204 includes a first perforation $1208_1$, a second perforation $1208_2$, a third perforation $1208_3$, a fourth perforation $1208_4$ and a fifth perforation $1208_5$. Each of the first perforation $1208_1$, the second perforation $1208_2$, the third perforation $1208_3$, the fourth perforation $1208_4$ and the fifth perforation $1208_5$ exhibit a perforation size (e.g., a diameter) that decreases from a first perforation size associated with the first perforation $1208_1$ to a fifth perforation size associated with the fifth perforation $1208_5$. While the various perforations are illustrated as having perforation sizes that decrease in diameter proceeding from a left side (or an upstream side) of the facesheet 1204 to a right side (or a downstream side) of the facesheet 1204, the disclosure contemplates alternative embodiments, such as, for example, perforation sizes that increase in diameter proceeding from the left side of the facesheet 1204 to the right side of the facesheet 1204, or perforation sizes that both decrease and increase in diameter proceeding from the left side of the facesheet 1204 to the right side of the facesheet 1204.

Figure 13:
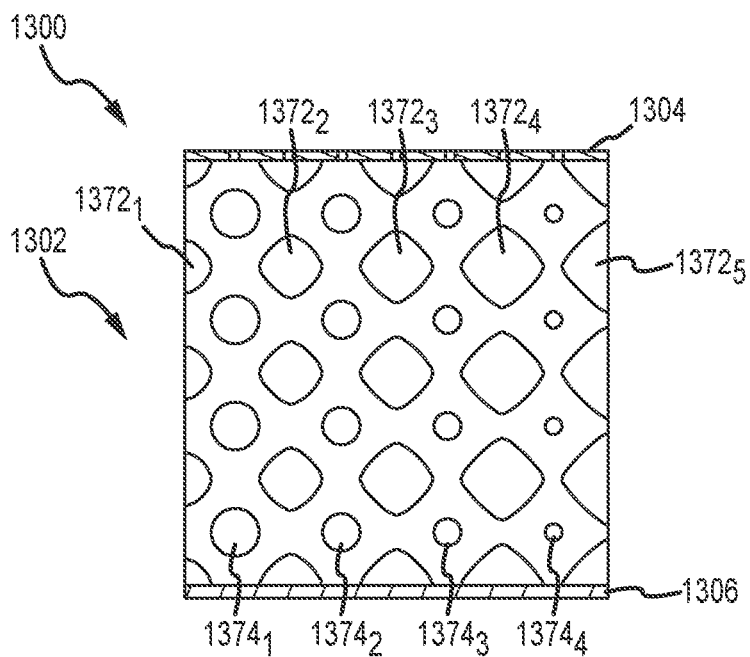
FIG. 13 is a schematic illustration of a noise attenuation panel of the present disclosure, in accordance with various embodiments.

Referring now to FIG. 13, a schematic illustration of a noise attenuation panel 1300 is provided, in accordance with various embodiments. Similar to the various embodiments described above, the noise attenuation panel 1300 includes a plurality of unit cells 1302 sandwiched between a facesheet 1304 and a back plate 1306. The facesheet 1304 typically includes a plurality of perforations or openings configured to communicate acoustic waves or energy to the plurality of unit cells 1302. Each member of the plurality of unit cells 1302 has properties and characteristics similar to the unit cell 202 and to the plurality of unit cells 232 described above with reference to FIGS. 2A and 2B, and so such properties and characteristics, including the manner of interconnecting the unit cells within the plurality of unit cells 1302 is not repeated here. In various embodiments, various of the plurality of unit cells 1302 exhibit different sizes and, particular to the illustrated embodiment, different sized tubes used to interconnect the unit cells comprising the plurality of unit cells 1302 (e.g., the axial tubes and the lateral tubes described above with reference to the various figures) and different sized volumes that surround the exterior surfaces of the unit cells comprising the plurality of unit cells 1302.

For example, a plurality of lateral tubes includes a first lateral tube $1374_1$, a second lateral tube $1374_2$, a third lateral tube $1374_3$, a fourth lateral tube $1374_4$ and a fifth lateral tube $1374_5$. Each of the first lateral tube $1374_1$, the second lateral tube $1374_2$, the third lateral tube $1374_3$, the fourth lateral tube $1374_4$ and the fifth lateral tube $1374_5$ exhibit a tube size (e.g., a diameter) that decreases from a first tube size associated with the first lateral tube $1374_1$ to a fifth tube size associated with the fifth lateral tube $1374_5$. While the various lateral tubes are illustrated as having tube sizes that decrease in diameter proceeding from a left side (or an upstream side) of the noise attenuation panel 1300 to a right side (or a downstream side) of the noise attenuation panel 1300, the disclosure contemplates alternative embodiments, such as, for example, tube sizes that increase in diameter proceeding from the left side of the noise attenuation panel 1300 to the right side of the noise attenuation panel 1300, or tube sizes that both decrease and increase in diameter proceeding from the left side of the noise attenuation panel 1300 to the right side of the noise attenuation panel 1300.

Still referring to FIG. 13, the volumes that surround the exterior surfaces of the unit cells exhibit different sizes. For example, a plurality of volumes includes a first volume $1372_1$, a second volume $1372_2$, a third volume $1372_3$, a fourth volume $1372_4$ and a fifth volume $1372_5$. Each of the first volume $1372_1$, the second volume $1372_2$, the third volume $1372_3$, the fourth volume $1372_4$ and the fifth volume $1372_5$ exhibit a volume size (e.g., a characteristic dimension) that increases from a first volume size associated with the first volume $1372_1$ to a fifth volume size associated with the fifth volume $1372_5$. While the various volumes are illustrated as having volume sizes that increase in characteristic dimension proceeding from a left side (or an upstream side) of the noise attenuation panel 1300 to a right side (or a downstream side) of the noise attenuation panel 1300, the disclosure contemplates alternative embodiments, such as, for example, volume sizes that decrease in characteristic dimension proceeding from the left side of the noise attenuation panel 1300 to the right side of the noise attenuation panel 1300, or volume sizes that both decrease and increase in characteristic dimension proceeding from the left side of the noise attenuation panel 1300 to the right side of the noise attenuation panel 1300. Note that where the volumes comprising the plurality of volumes are of varying or different sizes, in general, the unit cells comprising the plurality of unit cells that define the various volumes will also be of different sizes (e.g., where one or more of a first unit cell size, a second unit cell size, a third unit cell size or a fourth unit cell size exhibits a different characteristic dimension or dimensions from that of its neighboring unit cells).

Figure 14:
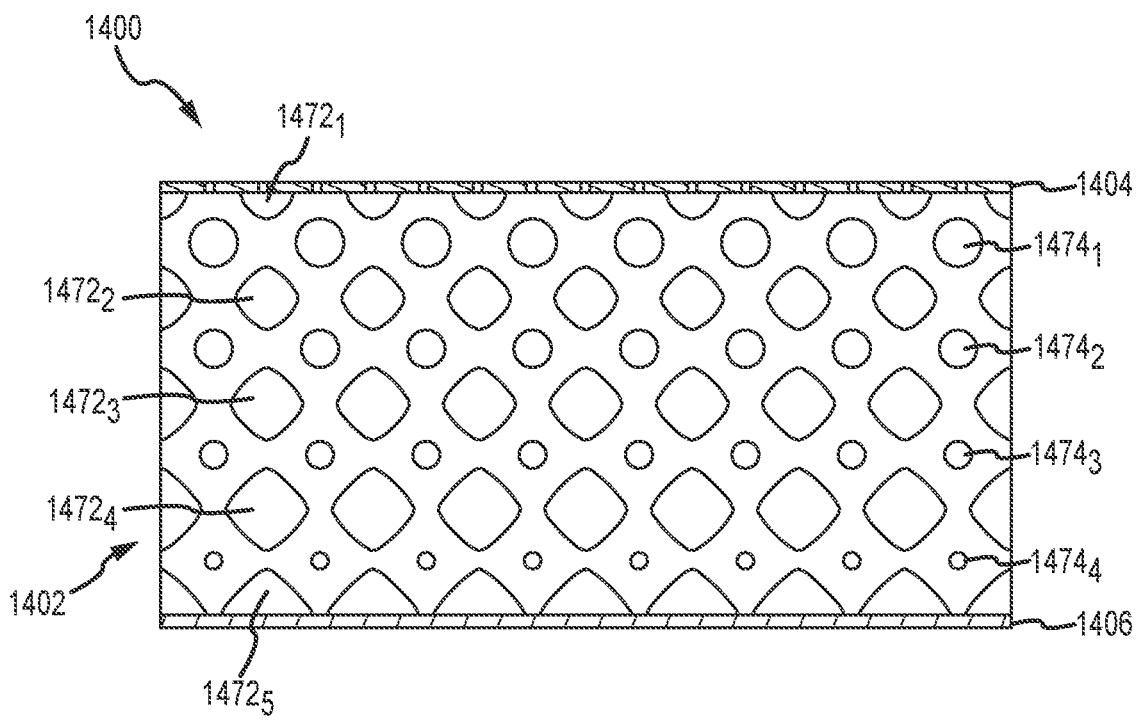
FIG. 14 is a schematic illustration of a noise attenuation panel of the present disclosure, in accordance with various embodiments.

Referring now to FIG. 14, a schematic illustration of a noise attenuation panel 1400 is provided, in accordance with various embodiments. Similar to the various embodiments described above, the noise attenuation panel 1400 includes a plurality of unit cells 1402 sandwiched between a facesheet 1404 and a back plate 1406. The facesheet 1404 typically includes a plurality of perforations or openings configured to communicate acoustic waves or energy to the plurality of unit cells 1402. Each member of the plurality of unit cells 1402 has properties and characteristics similar to the unit cell 202 and to the plurality of unit cells 232 described above with reference to FIGS. 2A and 2B, and so such properties and characteristics, including the manner of interconnecting the unit cells within the plurality of unit cells 1402 is not repeated here. In various embodiments, various of the plurality of unit cells 1402 exhibit different sizes and, particular to the illustrated embodiment, different sized tubes used to interconnect the unit cells comprising the plurality of unit cells 1402 (e.g., the axial tubes and the lateral tubes described above with reference to the various figures) and different sized volumes that surround the exterior surfaces of the unit cells comprising the plurality of unit cells 1302.

For example, a plurality of lateral tubes includes a first lateral tube $1474_1$, a second lateral tube $1474_2$, a third lateral tube $1474_3$ and a fourth lateral tube $1474_4$. Each of the first lateral tube $1474_1$, the second lateral tube $1474_2$, the third lateral tube $1474_3$ and the fourth lateral tube $1474_4$ exhibit a tube size (e.g., a diameter) that decreases from a first tube size associated with the first lateral tube $1474_1$ to a fourth tube size associated with the fourth lateral tube $1474_4$. While the various lateral tubes are illustrated as having tube sizes that decrease in diameter proceeding from the facesheet 1404 to the back plate 1406, the disclosure contemplates alternative embodiments, such as, for example, tube sizes that increase in diameter proceeding from the facesheet 1404 to the back plate 1406 or tube sizes that both decrease and increase in diameter proceeding from the facesheet 1404 to the back plate 1406.

Still referring to FIG. 14, the volumes that surround the exterior surfaces of the unit cells exhibit different sizes. For example, a plurality of volumes includes a first volume $1472_1$, a second volume $1472_2$, a third volume $1472_3$, a fourth volume $1472_4$ and a fifth volume $1472_5$. Each of the first volume $1472_1$, the second volume $1472_2$, the third volume $1472_3$, the fourth volume $1472_4$ and the fifth volume $1472_5$ exhibit a volume size (e.g., a characteristic dimension) that increases from a first volume size associated with the first volume $1472_1$ to a fifth volume size associated with the fifth volume $1472_5$. While the various volumes are illustrated as having volume sizes that increase in characteristic dimension proceeding from the facesheet 1404 to the back plate 1406, the disclosure contemplates alternative embodiments, such as, for example, volume sizes that decrease in characteristic dimension proceeding from the facesheet 1404 to the back plate 1406 or volume sizes that both decrease and increase in characteristic dimension proceeding from the facesheet 1404 to the back plate 1406.

Figure 15A:
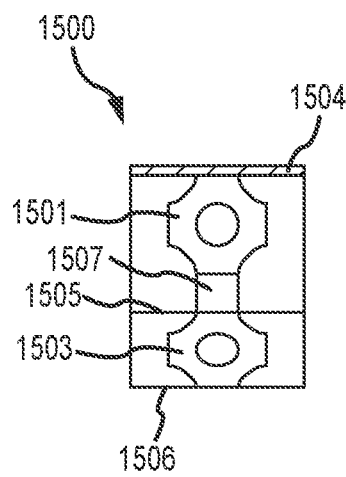
FIGS. 15A, 15B, 15C, 15D and 15E are schematic illustrations of various unit cell arrangements for a noise attenuation panel of the present disclosure, in accordance with various embodiments.

Referring now to FIGS. 15A, 15B, 15C, 15D and 15E, schematic views of various noise attenuation panels (or acoustic attenuation structures) are provided; the noise attenuation panels described and illustrated in these figures are oversimplified to explain various features of the panels. Referring, for example, to FIG. 15A, a noise attenuation panel 1500 is illustrated having a first unit cell 1501 and a second unit cell 1503 sandwiched between a facesheet 1504 and a back plate 1506. The facesheet 1504 typically includes a plurality of perforations or openings to communicate acoustic waves or energy to the first unit cell 1501 and then to the second unit cell 1503, which together act as a resonator to damp or attenuate the acoustic waves or energy. The back plate 1506 typically is non-perforated and, together with the facesheet 1504, provides a support structure for the noise attenuation panel 1500. In various embodiments, a septum 1505 separates the first unit cell 1501 and the second unit cell 1503, with the septum 1505 including a plurality of perforations or openings to communicate acoustic waves or energy between the first unit cell 1501 and the second unit cell 1503. In various embodiments, a connector 1507 (e.g., a tubular member) is used to connect the first unit cell 1501 and the second unit cell 1503, with the septum 1505 being disposed between the connector 1507 and the second unit cell 1503. Note, as illustrated, the first unit cell 1501 and the second unit cell 1503 may exhibit different shapes or sizes to further assist in tuning the noise attenuation panel 1500.

Figure 15B:
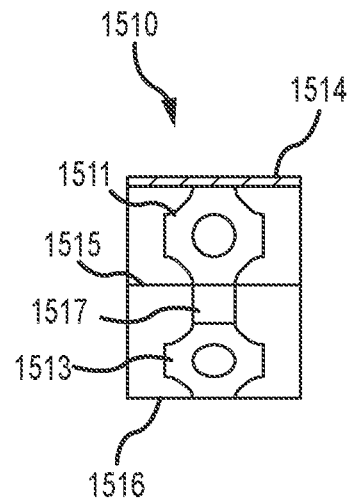

Referring now to FIG. 15B, a noise attenuation panel 1510 is illustrated having a first unit cell 1511 and a second unit cell 1513 sandwiched between a facesheet 1514 and a back plate 1516. The facesheet 1514 typically includes a plurality of perforations or openings to communicate acoustic waves or energy to the first unit cell 1511 and then to the second unit cell 1513, which together act as a resonator to damp or attenuate the acoustic waves or energy. The back plate 1516 typically is non-perforated and, together with the facesheet 1514, provides a support structure for the noise attenuation panel 1510. In various embodiments, a septum 1515 separates the first unit cell 1511 and the second unit cell 1513, with the septum 1515 including a plurality of perforations or openings to communicate acoustic waves or energy between the first unit cell 1511 and the second unit cell 1513. In various embodiments, a connector 1517 (e.g., a tubular member) is used to connect the first unit cell 1511 and the second unit cell 1513, with the septum 1515 being disposed between the connector 1517 and the first unit cell 1511.

Figure 15C:
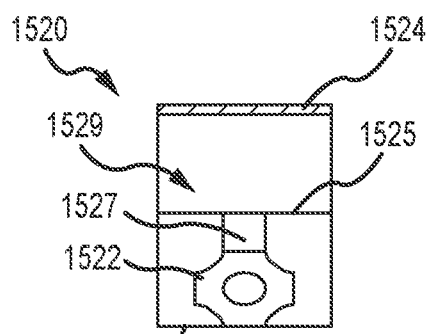

Referring now to FIG. 15C, a noise attenuation panel 1520 is illustrated having a unit cell 1522, a facesheet 1524, a back plate 1526 and a septum 1525. The facesheet 1524 typically includes a plurality of perforations or openings to communicate acoustic waves or energy to an open chamber 1529 and then to the unit cell 1522, which together act as a resonator to damp or attenuate the acoustic waves or energy. The back plate 1526 typically is non-perforated and, together with the facesheet 1524, provides a support structure for the noise attenuation panel 1520. In various embodiments, the septum 1525 separates the unit cell 1522 and the open chamber 1529, with the septum 1525 including a plurality of perforations or openings to communicate acoustic waves or energy between the unit cell 1522 and the open chamber 1529. In various embodiments, a connector 1527 (e.g., a tubular member) is used to connect the unit cell 1522 and the open chamber 1529, with the septum 1525 being disposed between the connector 1527 and the open chamber 1529.

Figure 15D:
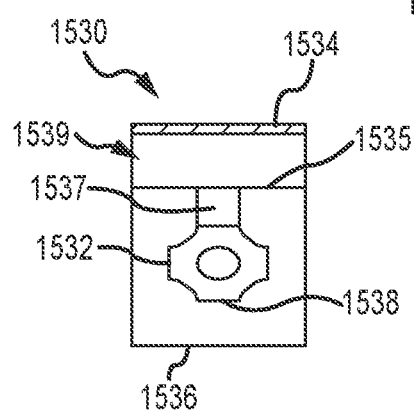

Referring now to FIG. 15D, a noise attenuation panel 1530 is illustrated having a unit cell 1532, a facesheet 1534, a back plate 1536 and a septum 1535. The facesheet 1534 typically includes a plurality of perforations or openings to communicate acoustic waves or energy to an open chamber 1539 and then to the unit cell 1532, which together act as a resonator to damp or attenuate the acoustic waves or energy. The back plate 1536 typically is non-perforated and, together with the facesheet 1534, provides a support structure for the noise attenuation panel 1530. In various embodiments, the septum 1535 separates the unit cell 1532 and the open chamber 1539, with the septum 1535 including a plurality of perforations or openings to communicate acoustic waves or energy between the unit cell 1532 and the open chamber 1539. In various embodiments, a connector 1537 (e.g., a tubular member) is used to connect the unit cell 1532 and the open chamber 1539, with the septum 1535 being disposed between the connector 1537 and the open chamber 1539. Note, in contrast with the noise attenuation panel 1520, the unit cell 1532 may not, in various embodiments, have a tube (e.g., a lateral tube 1538) in contact with the back plate 1536.

Figure 15E:
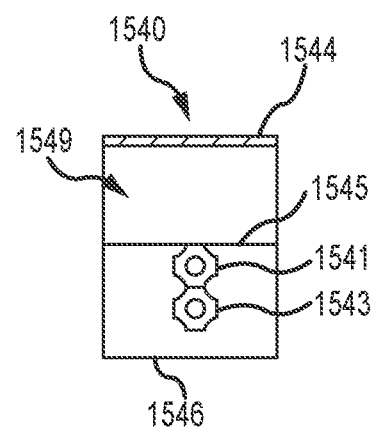

Referring now to FIG. 15E, a noise attenuation panel 1540 is illustrated having a first unit cell 1541, a second unit cell 1543, a facesheet 1544, a back plate 1546 and a septum 1545. The facesheet 1544 typically includes a plurality of perforations or openings to communicate acoustic waves or energy to an open chamber 1549 and then to the first unit cell 1541 and to the second unit cell 1543, which together act as a resonator to damp or attenuate the acoustic waves or energy. The back plate 1546 typically is non-perforated and, together with the facesheet 1544, provides a support structure for the noise attenuation panel 1540. In various embodiments, the septum 1545 separates the first unit cell 1541 and the open chamber 1549, with the septum 1545 including a plurality of perforations or openings to communicate acoustic waves or energy between the first unit cell 1541 and the open chamber 1549. Note, in contrast with, for example, the noise attenuation panel 1510, the noise attenuation panel 1520, the noise attenuation panel 1530, and the noise attenuation panel 1540, the first unit cell 1541 and the second unit cell 1543 are smaller in comparison to the sizes of the unit cells comprising the previous attenuation panels, thereby allowing for attenuation of noise at relatively higher frequencies.

Figure 16A:
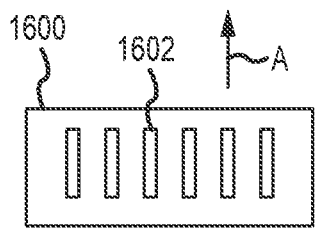
FIGS. 16A, 16B, 16C and 16D are schematic illustrations of various facesheets or septa or perforate structures for a noise attenuation panel of the present disclosure, in accordance with various embodiments.
Figure 16B:
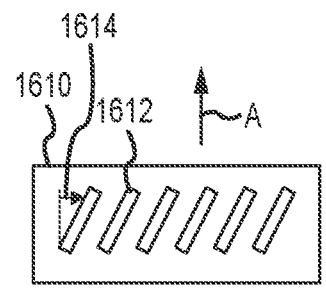
Figure 16C:
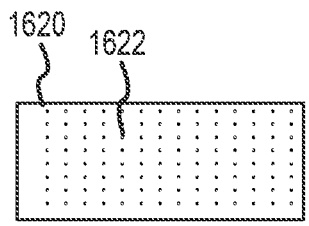
Figure 16D:
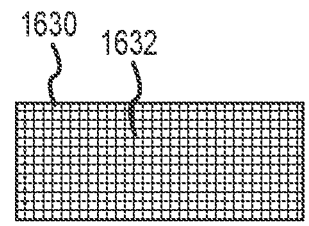

Referring briefly now to FIGS. 16A, 16B, 16C and 16D, schematic views of various structures used for the facesheets and septa and other perforated structures described throughout the disclosure are provided. Referring to FIG. 16A, for example, a perforated structure 1600 (e.g., a facesheet or a septum) includes a slot 1602 (or a plurality of slots) that is aligned in a generally axial direction with respect to a longitudinal axis A. In various embodiments, the slot 1602 exhibits an aspect ratio that may vary from a generally square-shaped configuration (e.g., 1:1 aspect ratio) to an elongated rectangular-shaped configuration (e.g., 10:1 aspect ratio). Referring to FIG. 16B, a perforated structure 1610 includes a slot 1612 (or a plurality of slots) that is aligned in a generally non-axial direction (or angled direction) with respect to a longitudinal axis A. In various embodiments, the slot 1612 exhibits an aspect ratio that may vary from a generally square-shaped configuration (e.g., 1:1 aspect ratio) to an elongated rectangular-shaped configuration (e.g., 10:1 aspect ratio). Further, the disclosure contemplates the non-axial direction may exhibit an angle 1614 with respect to the axial direction from plus ninety degrees (+90°) to minus ninety degrees (−90°). Referring to FIG. 16C, a perforated structure 1620 includes a plurality of perforations 1622 (e.g., circular holes) spaced about the surface of the perforated structure 1620. The plurality of perforations 1622 may exhibit a regular spacing (as illustrated) or a non-regular orientation. Referring to FIG. 16D, a perforated structure 1630 includes a mesh structure 1632. In various embodiments, the mesh structure 1632 may be formed by weaving various materials to have warp and weft interaction (e.g., longitudinal warp materials interwoven with transverse weft materials). Without loss of generality, each of the perforated structures just described may exhibit various percent openings with respect to the non-open portions of the perforated structures. For example, in various embodiments, the percent openings may range from about ten percent (10%) to about ninety percent (90%) or any range of values therebetween.

The foregoing disclosure provides an acoustic metamaterial (e.g., a material engineered to have a property or properties not found in naturally occurring materials) consisting of a periodic lattice structure made of a unit cell bulb-like structure that divides a space into two or more separated but intertwined fluid networks (e.g., the volumes and the tubes described above). The fluid networks are locally coupled at the junctions of the lattice structure to create arrays of resonator networks. The resonator networks may be varied in length, width or height to satisfy particular target frequencies for maximum sound absorption or attenuation. Distributed networks of various dimensions may be constructed for broadband absorption. Hybrid concepts include various forms of restrictions or space fillers for tuning the resulting noise attenuation panel. These space-fillers can act as bulk absorbers to extend the bandwidth and frequency range of acoustic attenuation or they can be partially or completely solid (or filled) for improved structural performance. Further, the unit cells may be constructed of different forms, sizes or shapes or may have similar, repeating shapes of the same size, such as, for example, including the Schwarz P periodic minimal surface. Advantageously, the various resonator networks, including networks exhibiting repeating and identically shaped unit cells, or networks exhibiting non-repeating and non-identically shaped unit cells, or networks comprising various restrictions (complete or partial) distributed throughout various tubes or volumes described above, may be fabricated using additive manufacturing techniques and dynamically modeled via acoustic performance analysis prior to manufacture. Other benefits of the disclosure include noise attenuation panels exhibiting greater damping or attenuation per unit volume as compared to conventional honeycomb liners. This benefit translates into potential weight reduction or fuel savings over existing technology. The noise attenuation panels described herein also provides an ability to replace conventional structural honeycomb liners with liners having better attenuation and structural properties.

Figures 17A, 17B:
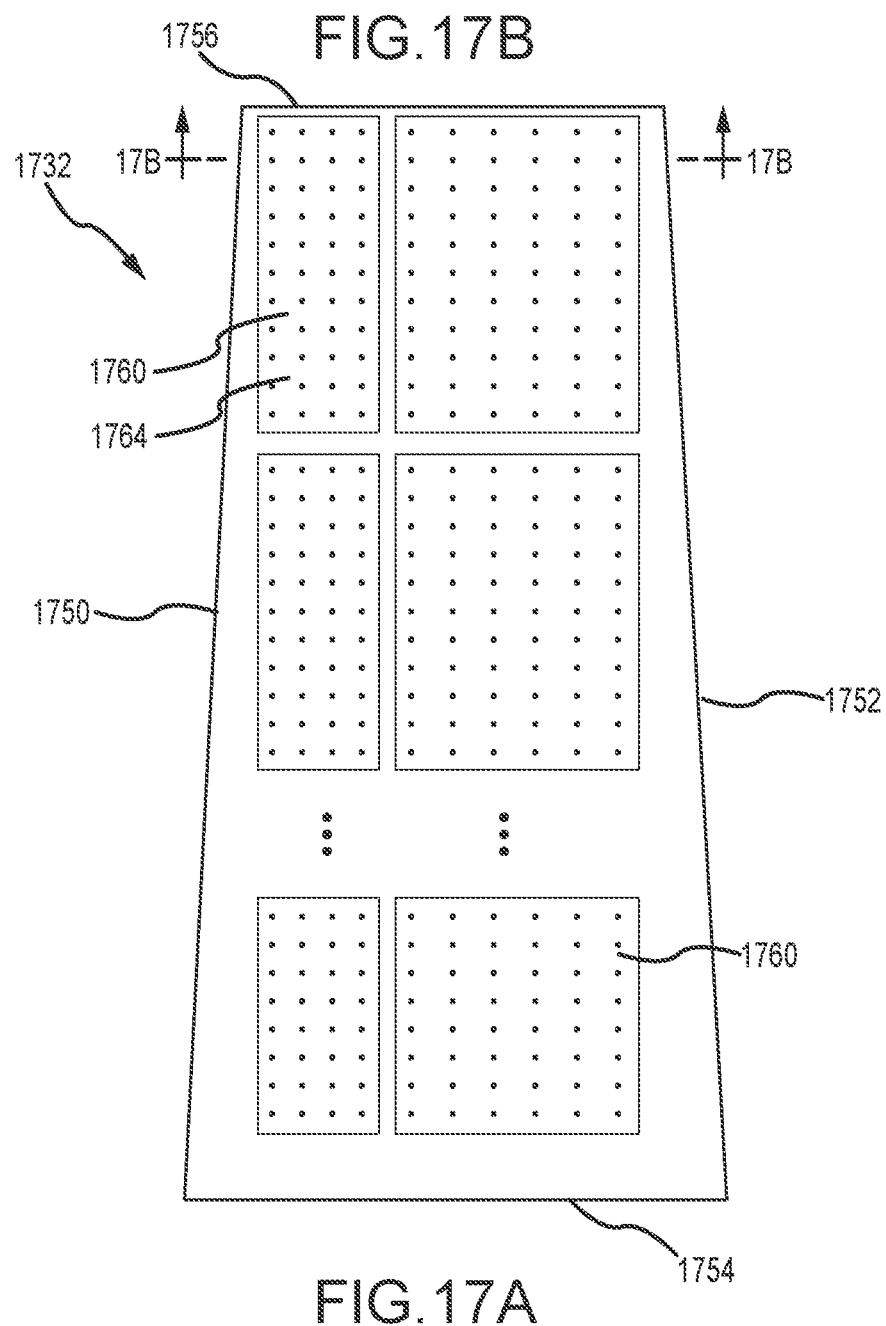
FIGS. 17A and 17B are schematic illustrations of an exit guide vane having a noise attenuation panel of the present disclosure, in accordance with various embodiments.

Referring now to FIGS. 17A and 17B, an exit guide vane 1732 having noise attenuation properties is described; FIG. 17B is a cross sectional view of the plan view illustrated in FIG. 17A. The exit guide vane 1732 includes a leading edge 1750, a trailing edge 1752, a base 1754 (e.g., for connecting to a core engine case or fixed inner structure) and a tip 1756 (e.g., for connecting to a nacelle case). The exit guide vane 1732 includes a noise attenuation panel 1760 (or an exit guide vane acoustic liner), or a plurality of noise attenuation panels, such as any of the noise attenuation panels or structures described above and throughout the disclosure. The noise attenuation panel 1760 may include a suction-side facesheet 1762 having a plurality of perforations or openings and a pressure-side facesheet 1764 having a plurality of perforations or openings, with the suction-side facesheet 1762 and the pressure-side facesheet 1764 sandwiching a plurality of unit cells 1770 oriented, sized and arranged in any of the configurations or equivalents thereof described above and throughout the disclosure. As described above, the plurality of perforations or openings is configured to communicate acoustic waves or energy to the plurality of unit cells 1770, which acts as a resonator to damp or attenuate the acoustic waves or energy.

Figure 18B:
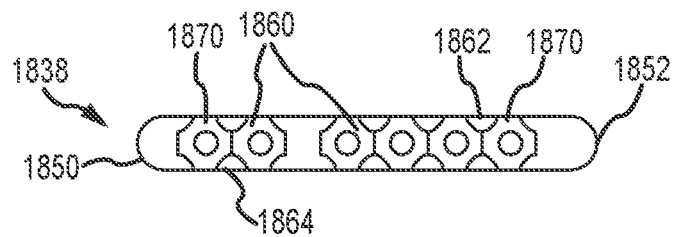
FIGS. 18A and 18B are schematic illustrations of a bifurcation structure having a noise attenuation panel of the present disclosure, in accordance with various embodiments.
Figure 18A:
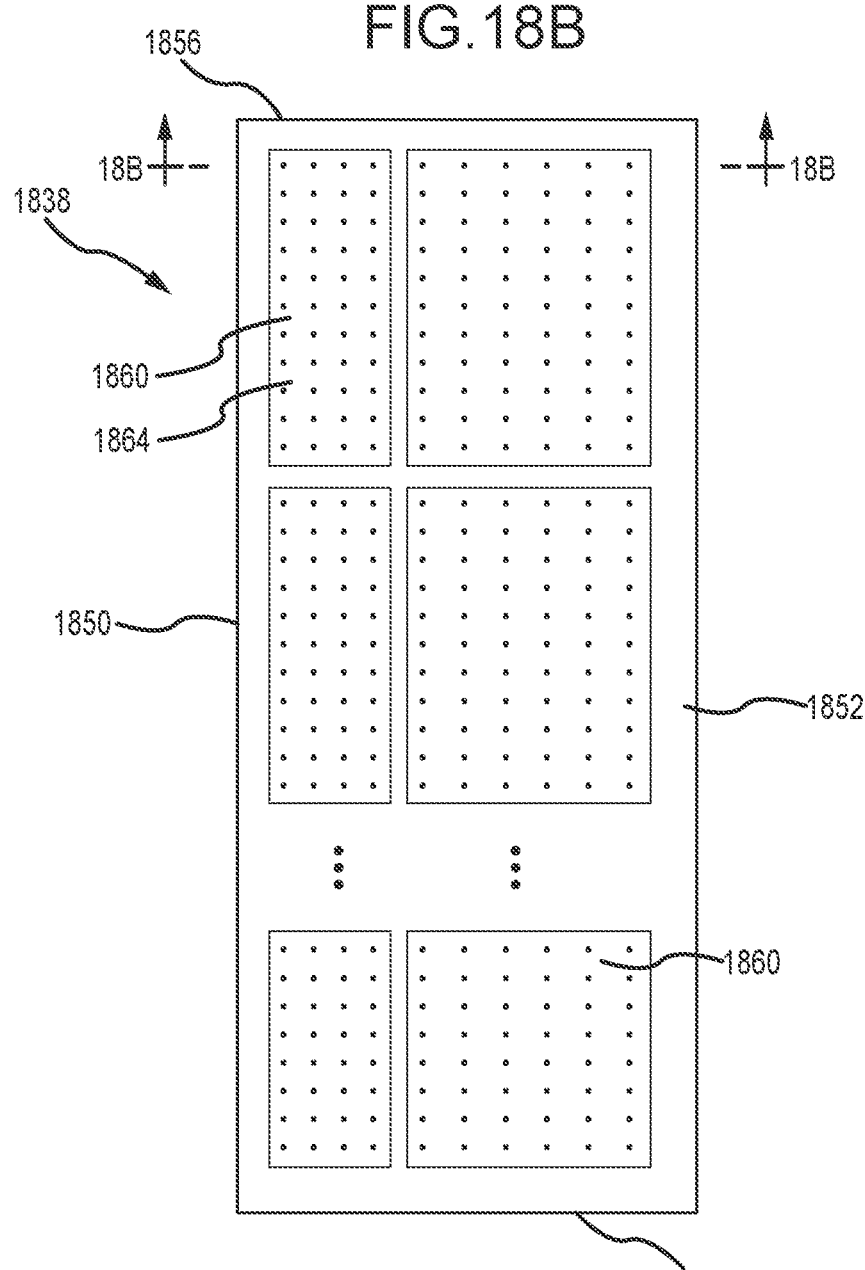

Referring now to FIGS. 18A and 18B, a bifurcation structure 1838 (e.g., an upper bifurcation structure or a lower bifurcation structure) having noise attenuation properties is described; FIG. 18B is a cross sectional view of the plan view illustrated in FIG. 18A. The bifurcation structure 1838 includes a leading edge 1850, a trailing edge 1852, a base 1854 (e.g., for connecting to a core engine case or fixed inner structure) and a tip 1856 (e.g., for connecting to a nacelle case). The bifurcation structure 1838 includes a noise attenuation panel 1860 (or a bifurcation structure acoustic liner), or a plurality of noise attenuation panels, such as any of the noise attenuation panels or structures described above and throughout the disclosure. The noise attenuation panel 1860 may include a first-side facesheet 1862 having a plurality of perforations or openings and a second-side facesheet 1864 having a plurality of perforations or openings, with the first-side facesheet 1862 and the second-side facesheet 1864 sandwiching a plurality of unit cells 1870 oriented, sized and arranged in any of the configurations or equivalents thereof described above and throughout the disclosure. As described above, the plurality of perforations or openings is configured to communicate acoustic waves or energy to the plurality of unit cells 1870, which acts as a resonator to damp or attenuate the acoustic waves or energy.

Figure 19:
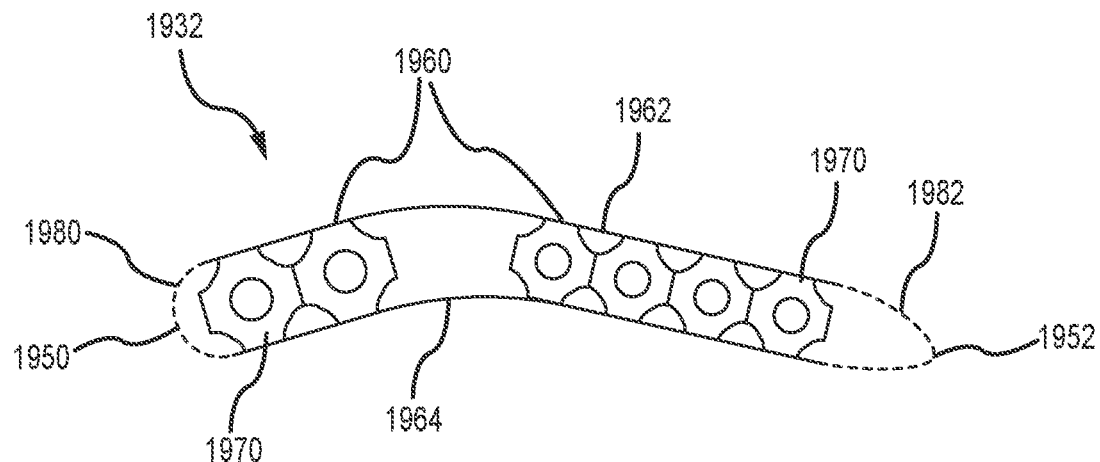
FIG. 19 is a schematic cross-sectional illustration of an exit guide vane having a noise attenuation panel of the present disclosure, in accordance with various embodiments.

Referring now to FIG. 19, a cross sectional view of an exit guide vane 1932 (similar to the exit guide vane 1732 illustrated at FIGS. 17A and 17B) having noise attenuation properties is illustrated. The exit guide vane 1932 includes a leading edge 1950 and a trailing edge 1952 and a noise attenuation panel 1960 (or an exit guide vane acoustic liner), or a plurality of noise attenuation panels, such as any of the noise attenuation panels or structures described above and throughout the disclosure. The noise attenuation panel 1960 may include a suction-side facesheet 1962 having a plurality of perforations or openings and a pressure-side facesheet 1964 having a plurality of perforations or openings, with the suction-side facesheet 1962 and the pressure-side facesheet 1964 sandwiching a plurality of unit cells 1970 oriented, sized and arranged in any of the configurations or equivalents thereof described above and throughout the disclosure. In addition, in various embodiments, the leading edge 1950 includes a leading-edge plurality of perforations or openings 1980 and the trailing edge 1952 includes a trailing-edge plurality of perforations or openings 1982 that extend at least a portion of a radial length extending from a base to a tip of the exit guide vane 1932. The leading-edge plurality of perforations or openings 1980 and the trailing-edge plurality of perforations or openings 1982 are configured to communicate acoustic waves or energy to the plurality of unit cells 1970 to further damp or attenuate the acoustic waves or energy.

Figure 20:
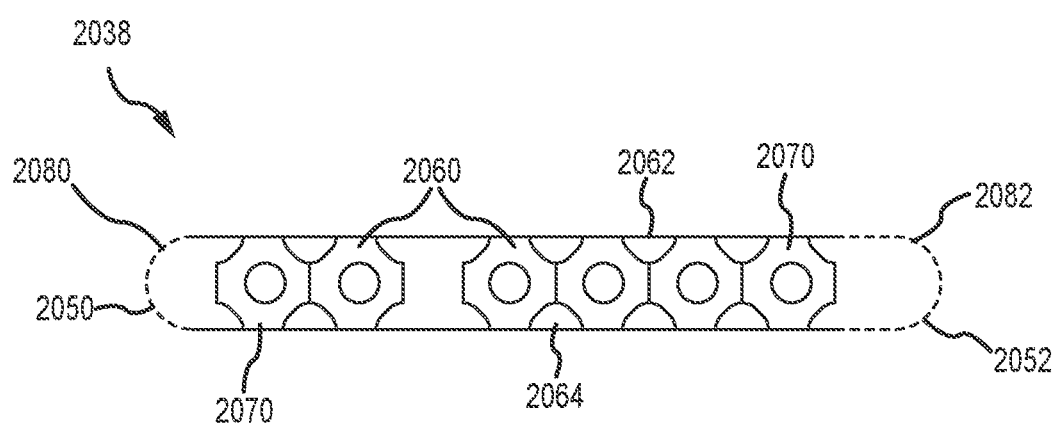
FIG. 20 is a schematic cross-sectional illustration of a bifurcation structure having a noise attenuation panel of the present disclosure, in accordance with various embodiments.

Referring now to FIG. 20, a cross sectional view of a bifurcation structure 2038 (similar to the bifurcation structure 1838 illustrated at FIGS. 18A and 18B) having noise attenuation properties is illustrated. The bifurcation structure 2038 includes a leading edge 2050 and a trailing edge 2052 and a noise attenuation panel 2060 (or a bifurcation structure acoustic liner), or a plurality of noise attenuation panels, such as any of the noise attenuation panels or structures described above and throughout the disclosure. The noise attenuation panel 2060 may include a first-side facesheet 2062 having a plurality of perforations or openings and a second-side facesheet 2064 having a plurality of perforations or openings, with the first-side facesheet 2062 and the second-side facesheet 2064 sandwiching a plurality of unit cells 2070 oriented, sized and arranged in any of the configurations or equivalents thereof described above and throughout the disclosure. In addition, in various embodiments, the leading edge 2050 includes a leading-edge plurality of perforations or openings 2080 and the trailing edge 2052 includes a trailing-edge plurality of perforations or openings 2082 that extend at least a portion of a radial length extending from a base to a tip of the bifurcation structure 2038. The leading-edge plurality of perforations or openings 2080 and the trailing-edge plurality of perforations or openings 2082 are configured to communicate acoustic waves or energy to the plurality of unit cells 2070 to further damp or attenuate the acoustic waves or energy.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An exit guide vane for a propulsion system, comprising:
    a suction-side facesheet;
    a pressure-side facesheet; and
    an acoustic attenuation structure disposed between the suction-side facesheet and the pressure-side facesheet, the acoustic attenuation structure including a periodic structure including a first unit cell, the first unit cell including a first central body, a first axial tube, a second axial tube, a first lateral tube, a second lateral tube, a third lateral tube, and a fourth lateral tube, the first axial tube disposed on the first central body and the second axial tube disposed on the first central body, opposite the first axial tube, each of the first axial tube and the second axial tube being in fluid communication with one another through the first central body,
    wherein at least one of the first axial tube, the second axial tube, the first lateral tube, the second lateral tube, the third lateral tube, or the fourth lateral tube is at least partially sealed via a septum configured to restrict a flow of fluid therethrough.

2. The exit guide vane of claim 1, wherein the first lateral tube is disposed on and in fluid communication with the first central body, and the second lateral tube is opposite the first lateral tube and disposed on and in fluid communication with the first central body.

3. The exit guide vane of claim 2, wherein the third lateral tube is disposed on and in fluid communication with the first central body, and the fourth lateral tube is opposite the third lateral tube and disposed on and in fluid communication with the first central body.

4. The exit guide vane of claim 3, wherein each of the first axial tube, the second axial tube, the first lateral tube, the second lateral tube, the third lateral tube and the fourth lateral tube are in fluid communication with each other via the first central body.

5. The exit guide vane of claim 2, further comprising a second unit cell interconnected to the first unit cell, the second unit cell including a second central body and a pair of axial tubes and a pair of lateral tubes disposed on and in fluid communication with the second central body.

6. The exit guide vane of claim 5, wherein the first lateral tube of the first unit cell is interconnected to one of the pair of lateral tubes of the second unit cell.

7. The exit guide vane of claim 6, further comprising a third unit cell interconnected to the first unit cell and a fourth unit cell interconnected to the second unit cell and to the third unit cell, wherein each of the first unit cell, the second unit cell, the third unit cell and the fourth unit cell is comprised within a layer of unit cells.

8. A bifurcation structure for a propulsion system, comprising:
a first-side facesheet;
a second-side facesheet; and
an acoustic attenuation structure disposed between the first-side facesheet and the second-side facesheet, the acoustic attenuation structure including a periodic structure including a first unit cell, the first unit cell including a first central body, a first axial tube, a second axial tube, a first lateral tube, a second lateral tube, a third lateral tube, and a fourth lateral tube, the first axial tube disposed on the first central body and the second axial tube disposed on the first central body, opposite the first axial tube, each of the first axial tube and the second axial tube being in fluid communication with one another through the first central body,
wherein at least one of the first axial tube, the second axial tube, the first lateral tube, the second lateral tube, the third lateral tube or the fourth lateral tube is partially sealed via a septum configured to partially restrict a flow of fluid therethrough.

9. The bifurcation structure of claim 8, wherein the first lateral tube is disposed on and in fluid communication with the first central body, and the second lateral tube is opposite the first lateral tube and disposed on and in fluid communication with the first central body.

10. The bifurcation structure of claim 9, wherein the third lateral tube is disposed on and in fluid communication with the first central body, and the fourth lateral tube is opposite the third lateral tube and disposed on and in fluid communication with the first central body.

11. The bifurcation structure of claim 10, wherein each of the first axial tube, the second axial tube, the first lateral tube, the second lateral tube, the third lateral tube and the fourth lateral tube are in fluid communication with each other via the first central body.

12. The bifurcation structure of claim 9, further comprising a second unit cell interconnected to the first unit cell, the second unit cell including a second central body and a pair of axial tubes and a pair of lateral tubes disposed on and in fluid communication with the second central body.

13. The bifurcation structure of claim 12, further comprising a third unit cell interconnected to the first unit cell and a fourth unit cell interconnected to the second unit cell and to the third unit cell, wherein each of the first unit cell, the second unit cell, the third unit cell and the fourth unit cell is comprised within a layer of unit cells.

14. A noise attenuation panel for a structure within a propulsion system, comprising:
a first periodic structure including a first unit cell, a second unit cell, a third unit cell and a fourth unit cell, wherein each of the first unit cell, the second unit cell, the third unit cell and the fourth unit cell includes a central body interconnected via a plurality of lateral tubes extending from the central body, the first periodic structure forming a first lateral layer of unit cells;
a facesheet and a back plate configured to enclose the first periodic structure;
a second periodic structure, the second periodic structure forming a second lateral layer of unit cells interconnected to the first lateral layer of unit cells, the second lateral layer of unit cells being interconnected to the first lateral layer of unit cells via a plurality of axial tubes, and
wherein the first lateral layer of unit cells and the second lateral layer of unit cells each comprise a plurality of volumes extending axially between adjacent pairs of unit cells that comprise the first lateral layer of unit cells and the second lateral layer of unit cells and wherein the plurality of volumes defines a space exterior to the first lateral layer of unit cells, the space being either partially restricted or completely restricted by a volume filler.

15. The noise attenuation panel of claim 14, wherein the plurality of volumes includes a first volume including a first volume size and a second volume including a second volume size different from the first volume size.

* * * * *